United States Patent
Mazur et al.

(10) Patent No.: US 12,085,921 B2
(45) Date of Patent: Sep. 10, 2024

(54) MANAGING FIRMWARE AND SOFTWARE UPDATES WITHIN A SECURE DEPLOYMENT SYSTEM

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Nathaniel S. Sandler, Chagrin Falls, OH (US); Jonathan Alan Mills, Mayfield Heights, OH (US); Todd A. Wiese, Hubertus, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/107,004

(22) Filed: Feb. 7, 2023

(65) Prior Publication Data
US 2024/0160190 A1    May 16, 2024

Related U.S. Application Data

(60) Provisional application No. 63/425,117, filed on Nov. 14, 2022.

(51) Int. Cl.
*G06F 21/00* (2013.01)
*G05B 19/418* (2006.01)

(52) U.S. Cl.
CPC ........... *G05B 19/4185* (2013.01); *G05B 2219/23317* (2013.01); *G05B 2219/25205* (2013.01)

(58) Field of Classification Search
CPC ...... G05B 19/4185; G05B 2219/23317; G05B 2219/25205
See application file for complete search history.

(56) References Cited

U.S. PATENT DOCUMENTS 10,097,585 B2 * 10/2018 Bush ............... H04L 63/107
10,715,388 B2    7/2020 Fildebrandt et al.
(Continued)

FOREIGN PATENT DOCUMENTS

KR    20200027783 A    3/2020
WO    2020184362 A1    9/2020

OTHER PUBLICATIONS

Extended European Search Report for European Patent Application No. 21179775.8, dated Nov. 25, 2021, 9 pages.
(Continued)

*Primary Examiner* — Don G Zhao
(74) *Attorney, Agent, or Firm* — Fletcher Yoder, P.C.

(57) ABSTRACT

A method may include receiving, via a secure deployment management (SDM) system, a notification indicative of a change in configuration data associated with an industrial device from a secure deployment management (SDM) node associated with the industrial device. The notification is received via a secure communication channel established by the SDM system with the SDM node and one or more security protocols. The method also includes retrieving, via the SDM system, the configuration data associated with the industrial device from a data source in response to receiving the notification and sending, via the SDM system, the configuration data to the SDM node via the secure communication channel. The industrial device may receive the configuration data from the SDM node without performing one or more security operations on the configuration data.

11 Claims, 11 Drawing Sheets

(56) References Cited

U.S. PATENT DOCUMENTS

| | | | |
|---|---|---|---|
| 10,955,816 B2* | 3/2021 | Mazur | G05B 19/4185 |
| 11,182,206 B2 | 11/2021 | Jung et al. | |
| 11,474,873 B2 | 10/2022 | Biernat et al. | |
| 11,513,877 B2 | 11/2022 | Biernat et al. | |
| 11,556,109 B2* | 1/2023 | Mazur | G05B 19/406 |
| 2009/0271504 A1* | 10/2009 | Ginter | H04L 63/02 |
| | | | 709/220 |
| 2015/0281233 A1* | 10/2015 | Asenjo | G06F 21/44 |
| | | | 726/7 |
| 2018/0024537 A1 | 1/2018 | Chauvet et al. | |
| 2018/0025304 A1* | 1/2018 | Fisher | H04L 67/06 |
| | | | 726/4 |
| 2018/0027054 A1* | 1/2018 | Toepke | H04L 69/22 |
| | | | 709/222 |
| 2018/0054469 A1 | 2/2018 | Simoncelli | |
| 2019/0377604 A1 | 12/2019 | Cybulski | |
| 2020/0096965 A1* | 3/2020 | Mazur | G06F 16/26 |
| 2020/0103865 A1* | 4/2020 | Newton | H04L 41/12 |
| 2020/0136906 A1 | 4/2020 | Bernat et al. | |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2021/0089354 A1 | 3/2021 | Nixon et al. | |
| 2021/0181707 A1* | 6/2021 | Mazur | G05B 19/406 |
| 2021/0200814 A1 | 7/2021 | Tal et al. | |
| 2021/0218617 A1 | 7/2021 | Palavalli et al. | |
| 2021/0351980 A1* | 11/2021 | Huffman | G06F 21/554 |
| 2021/0352110 A1* | 11/2021 | Huffman | H04L 63/20 |
| 2021/0382727 A1 | 12/2021 | Vigil et al. | |
| 2022/0027217 A1 | 1/2022 | Thoemmes et al. | |
| 2022/0091572 A1 | 3/2022 | Biernat et al. | |
| 2022/0103517 A1* | 3/2022 | Luotojärvi | H04L 63/0876 |
| 2022/0365506 A1* | 11/2022 | Mayer | G06F 21/10 |
| 2023/0052998 A1* | 2/2023 | Kande | H04L 63/18 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface, retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Microsoft Learn, "What is Azure Sphere?" Microsoft Learn, Dec. 1, 2022, 10 pages.

Liu, Y. et al., "A Data-Centric Internet of Things Framework Based on Azure Cloud," IEEE Access, vol. 7, Mar. 27, 2019, 20 pages.

* cited by examiner

MANAGING FIRMWARE AND SOFTWARE UPDATES WITHIN A SECURE DEPLOYMENT SYSTEM

CROSS REFERENCE TO RELATED APPLICATION

This application claims priority to and the benefit of U.S. Provisional Patent Application Ser. No. 63/425,117, entitled "Facilitating Direct Device-to-Cloud Communications within a Secure Deployment Management System," filed Nov. 14, 2022, that is incorporated herein by reference in the entirety.

BACKGROUND

The present disclosure generally relates to cloud services in an industrial system. More specifically, the present disclosure is related to providing improved security features within a cloud services platform that operates with industrial automation devices.

An industrial automation system may use a number of industrial automation components. The industrial automation components may include a wide range of components, such as valves, electric motors, a wide range of sensors, other suitable monitoring devices, or the like. The industrial automation components may provide data indicative of information or status therefrom. Moreover, the industrial automation components may include programming terminals, automation controllers, input/output (I/O) modules, communication networks, human-machine interface (HMI) terminals, and the like, to receive statuses and/or information in the form of data.

Some networked components of the industrial automation system may receive statuses and/or information in various informative formats, such as alerts to change or adjust operation of one or more components of the industrial automation system to manage the industrial automation system or the like. Generally, a control system may facilitate performance of an industrial automation process by controlling operations of one or more automation devices. For example, to facilitate performing an industrial automation process, the control system may determine a control action and instruct an automation device (e.g., a rod-pump) to perform the control action based on software installed on the control system. Additionally, the control system may facilitate monitoring performance of the process to determine whether the process is operating as desired. When not operating as desired, the control system may also facilitate performing diagnostics on the process to determine a cause of undesired operation.

Generally, the networked components described above may be associated with information, such as different statuses, sensing data, or the like. The information may relate to an operation of the industrial automation system and may be monitored by one or more automation control and monitoring systems. Certain communication systems are used to transmit the information to an automation control and monitoring system of the industrial automation system. For example, each networked device may communicate with one or more automation control and monitoring systems via wired or wireless communication networks. However, the communication networks may be vulnerable to various security threats. With this in mind, it may be useful to improve methods for communication between automation control and monitoring systems and networked devices within industrial automation systems while enhancing the security protocols employed therein.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via a secure deployment management (SDM) system, a notification indicative of a change in first configuration data associated with an industrial device from a secure deployment management (SDM) node associated with the industrial device. The notification is received via a secure communication channel established by the SDM system with the SDM node and one or more security protocols. The method also includes retrieving, via the SDM system, second configuration data associated with the industrial device from a data source in response to receiving the notification and sending, via the SDM system, the second configuration data to the SDM node via the secure communication channel. The industrial device may receive the second configuration data from the SDM node without performing one or more security operations on the configuration data. The second configuration data corresponds to the first configuration data excluding the change in the first configuration data.

In another embodiment, a system may include a computing system that may manage a plurality of communications between a plurality of industrial devices by applying one or more security protocols to each of the plurality of communications. The system may also include a plurality of microcontroller units integrated within the plurality of industrial devices. Each of the plurality of microcontroller units may detect a change in first configuration data associated with a respective industrial device of the plurality of industrial devices, send a notification indicative of the change via a secure communication channel established by the computing system using one or more security protocols, and receive second configuration data associated with one or more operations that corresponds to the respective industrial device from the computing system. The second configuration data received from the computing system excludes the change. Each of the plurality of microcontroller units may also transmit the second configuration data directly to the respective industrial device, such that each of the plurality of industrial devices is configured to receive the second configuration data without applying a security feature to the configuration data.

In yet another embodiment, a non-transitory computer-readable medium comprising computer-executable instructions that, when executed, are configured to cause at least one processor to perform one or more operations including receiving a notification indicative of a change in first configuration data associated with an industrial device from a secure deployment management (SDM) node associated with the industrial device. The notification is received via a secure communication channel established by at least one processor with the SDM node and one or more security protocols. The operations may also include retrieving second configuration data associated with the industrial device from a data source in response to receiving the notification and sending the second configuration data to the SDM node via the secure communication channel. The industrial device may receive the second configuration data directly from the SDM node without performing one or more security operations on the second configuration data.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
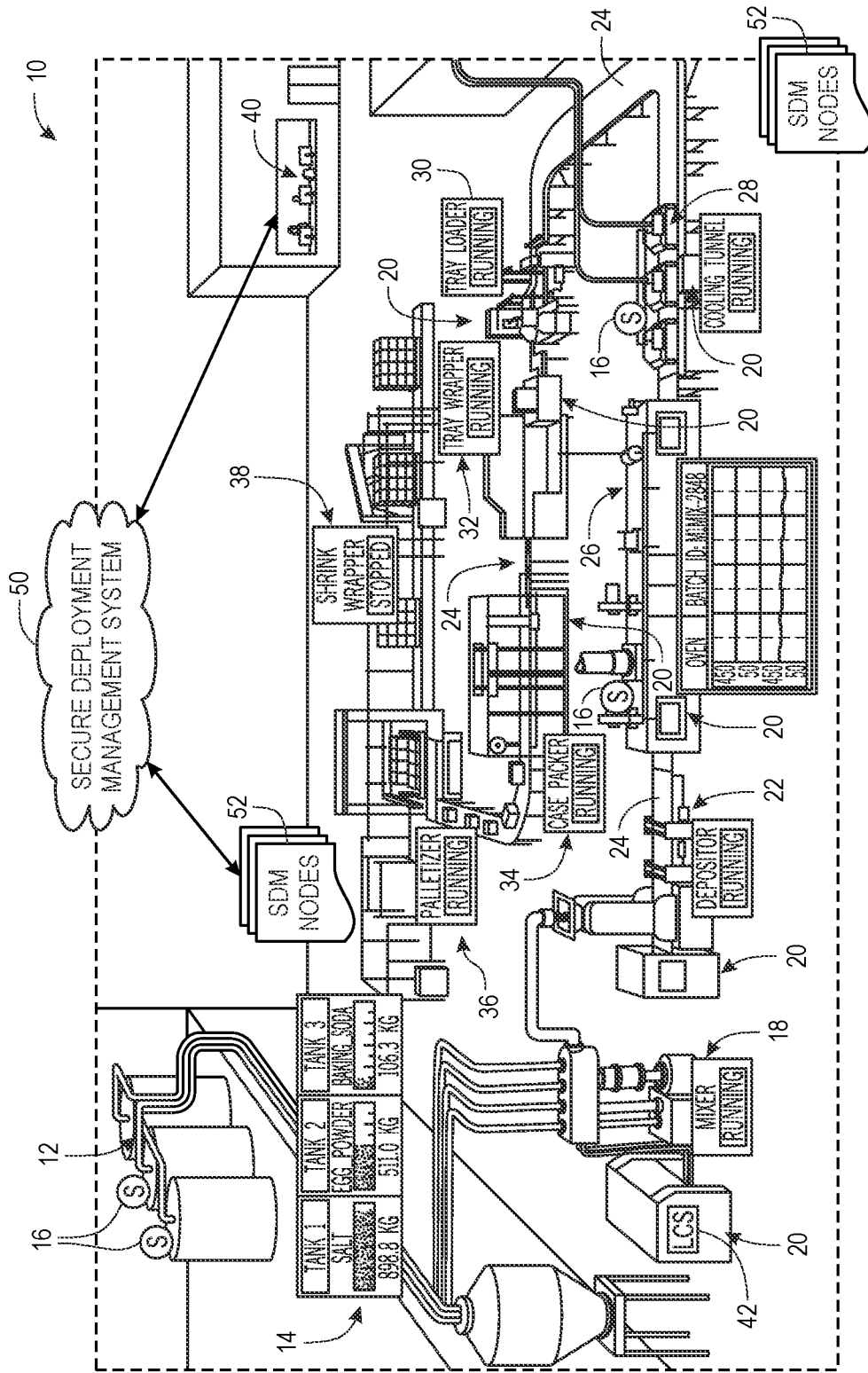
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As mentioned above, some industrial automation components may communicate data within a network (e.g., the Internet) or between other industrial automation components while remaining vulnerable to network security threats. That is, some industrial components may lack of security features, thereby leaving the industrial automation components (and the industrial automation systems in which the components are implemented) susceptible to attack from malignant entities. Indeed, in some embodiments, the industrial automation components may operate within an operational technology (OT) network that allowed the industrial automation components to communicate between each other and remain isolated from other networks (e.g., information technology (IT) network). However, as hackers increasingly target industrial systems, the isolation from other networks may not provide sufficient security to prevent potential attacks on the OT networked devices.

With this in mind, the present disclosure is directed to a secure deployment system that coordinates communications between industrial automation components in a secure fashion. That is, the secure deployment system may include a cloud services platform that provides built-in communication and secure features for network-enabled devices that are registered within the platform. In some cases, the secure deployment system may be implemented as a cloud services platform that provides continuous and renewable security protocols via a cloud-based security service. As such, in some embodiments, the secure deployment system may interact or communicate with a microcontroller unit (MCU) or other suitable processor-based devices that may be installed or integrated on a respective industrial automation component (e.g., drive) to provide a secure application environment that authenticates connections, deploys software updates automatically to the respective component, records product usage data via secured connections, and the like.

By way of example, drive applications may provide a rich set of data that can be used for control purposes for automating equipment in several ways including providing diagnostic data to assure efficient and continuous sustained operation. In some cases, drives or other industrial automation devices may be accessed through networked systems that may have standalone industrial and commercial applications in remote areas to enable monitoring of the device. Indeed, the standalone industrial and commercial applications may maintain operation and health of the device, while providing segregated control operations from asset management and monitoring solutions, thereby preventing access to potential hackers. However, this standalone control system limits the visibility and access to remote users and data consumers.

With the foregoing in mind, the secure deployment system described herein may provide a secure infrastructure for the drive or other suitable device to have direct-to-cloud monitoring and data acquisition capabilities by monitoring or coordinating the communications between the device and other network components only via a secure cloud services platform facilitated by the secure deployment system. That is, an MCU or other on-device cloud interface processing/network component may provide direct-to-cloud (e.g., without routing to indirect components) network connections to facilitate device monitoring and diagnostic functions for securing standalone applications while maintaining a secure connection therebetween. That is, in some embodiments, the secure deployment system may authenticate the MCU that is part of the drive and establish a secure network connection directly (e.g., without routing through intermediate components) between the MCU and the secure deployment system. After the MCU is authenticated and the secure channel is established, secure deployment system may monitor data transmissions, as received directly from the drive. Indeed, the MCU may be integrated with the drive to perform operations related to the operation of the drive while performing authentication operations with the secure deployment system and establishing secure network connections with the secure deployment system.

As a result of operating within this secure cloud services platform, the presently disclosed embodiments provide several benefits including standalone control, remote cloud-based human interface module (HIM) access, black box diagnosis, computerized maintenance management system (CMMS) integration, automated diagnostic workflows to identify and resolve issues, and the like without incorporating security features within each respective function or device. In other words, since the secure cloud services platform manages the integrity of the communication architecture, the respective devices may perform stand-alone operations, send communications, and the like without performing additional processing tasks related to authenticating the integrity of the communicatively connected devices. In other words, the respective devices lack any security features (e.g., encryption, security protocols) and instead relies on the cloud services platform to secure its communications. In this way, the respective computing resources of the industrial automation components are maximized to control and manage the respective operations of the respective machines performing tasks within the industrial automation system, while avoiding processing tasks related to ensuring that the communications transmitted and received therewithin are secure. Additional details with regard to employing the secure deployment system to perform various types of secure cloud services for industrial automation components that are part of the OT network or other suitable network will be described below with reference to FIGS. 1-10.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

In some embodiments, the industrial automation devices 20, the supervisory control system 40, the local control system 42, and other network-capable devices within the industrial automation system 10 may communicate with a secure deployment management (SDM) system 50. The SDM system 50 may include one or more computing devices that provide cloud services or services to the connected components on demand, periodically, and the like. The SDM system 50 may include an infrastructure of server devices, databases, storage components, and the like to facilitate the flow of data between the industrial automation devices 20, the supervisory control system 40, the local control system 42, and other network-capable devices within the industrial automation system 10. By way of operation, the SDM system 50 may access and execute software that enables the SDM system 50 to coordinate with other third-party devices (e.g., servers), establish secure communication channels with connected devices, perform various services on connected devices, and the like.

In some embodiments, the SDM system 50 may communicate with SDM nodes 52, which may be integrated with the industrial automation devices 20, the supervisory control system 40, the local control system 42, and other network-capable devices within the industrial automation system 10.

The SDM nodes 52 may include system-on-chip (SoC) components or other processing hardware (e.g., processor, controller, microcontroller) that is preregistered with the SDM system 50. The SDM nodes 52 may thus coordinate security tasks or protocols with the SDM system 50 to establish secure channels, monitor for security threats, and the like. The SDM system 50 may access updated security threat data periodically and update the communication filtering or monitoring operations performed by the SDM nodes 52 to ensure that the communication channels between the two devices are dynamically updated to continuously provide secure communication channels.

Figure 2:
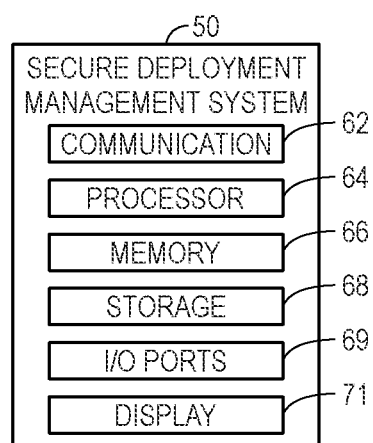
FIG. 2 example components that may be part of a secure deployment management system that may be implemented in the industrial automation system, in accordance with an embodiment.
Figure 3:
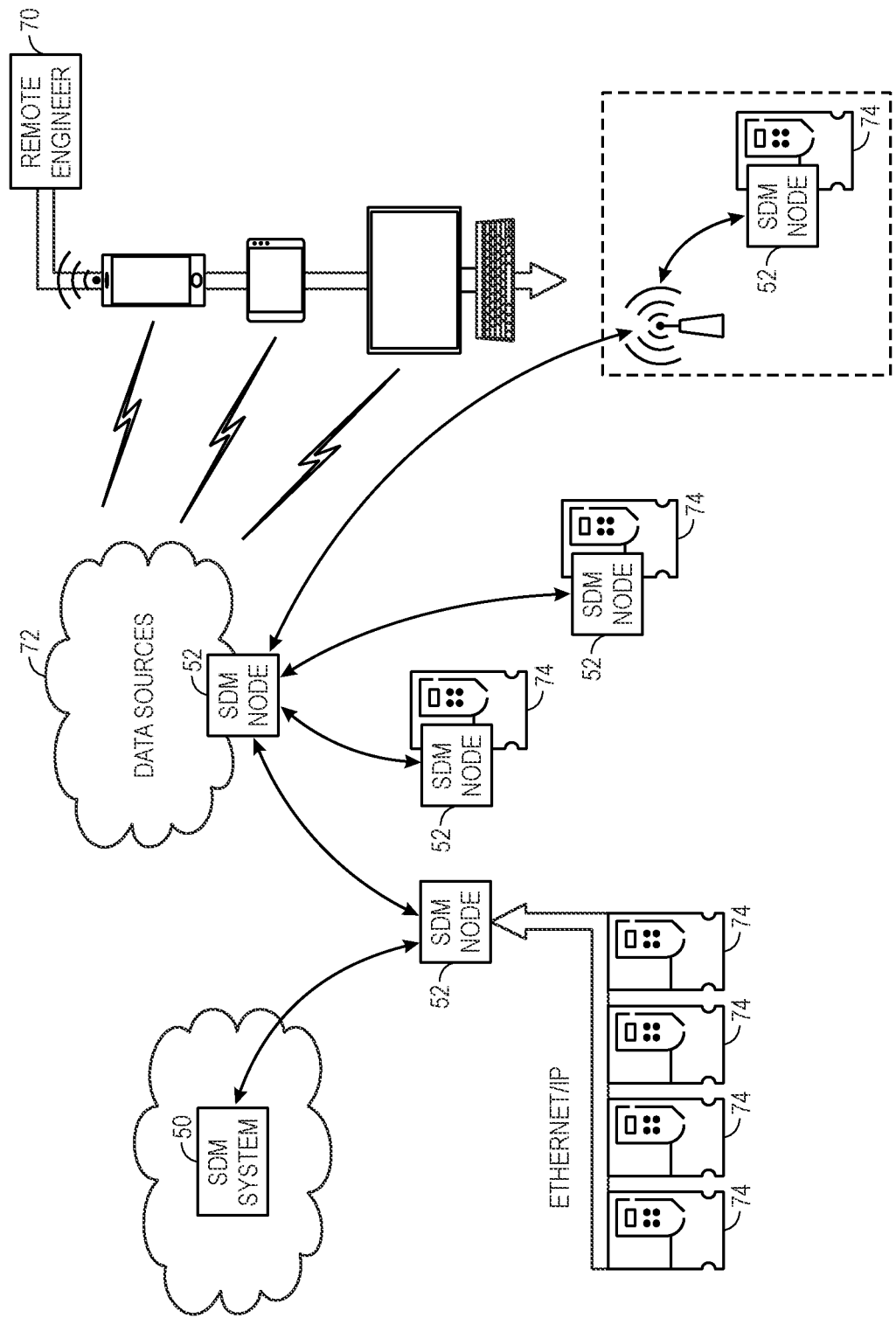
FIG. 3 illustrates an example communication network that includes the secure deployment management system and other components of the industrial system, in accordance with an embodiment.

By way of example, FIG. 2 illustrates a diagrammatical representation of an exemplary SDM system 50 that may be employed in any suitable industrial automation system 10, in accordance with embodiments presented herein. As shown in FIG. 3, the SDM system 50 may include a communication component 62 (e.g., communication circuitry), a processor 64, a memory 66, a storage 68, input/output (I/O) ports 69, a display 71, and the like. The communication component 62 may be a wireless or wired communication component that may facilitate communication between the industrial automation devices 20, the local control system 42, and other communication capable devices.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include provisioning the devices communicatively coupled to the SDM system 50, securing communication channels, and perform other functions as will be details below.

The memory 66 and the storage 68 may also be used to store the data, analysis of the data, the software applications, and the like. For example, the memory 66 and the storage 68 may store instructions associated with coordinating operations with other service devices, databases, and the like to perform the techniques described herein. The memory 66 and the storage 68 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

The I/O ports 69 may be interfaces that may couple to other peripheral components such as input devices (e.g., keyboard, mouse), sensors, input/output (I/O) modules, and the like. The I/O modules may enable the industrial automation devices 20 to communicate with the SDM system 50 or other devices in the industrial automation system 10 via the I/O modules. As such, the I/O modules may include power modules, power monitors, network communication modules, and the like manufactured by the various manufacturers.

The display 71 may depict visualizations associated with software or executable code being processed by the processor 64. In one embodiment, the display 71 may be a touch display capable of receiving inputs (e.g., parameter data for operating the industrial automation equipment) from a user of the industrial automation device 20. As such, the display 71 may serve as a user interface to communicate with control/monitoring device 48. The display 71 may display a graphical user interface (GUI) for operating the respective devices and the like. The display 71 may be any suitable type of display, such as a liquid crystal display (LCD), plasma display, or an organic light emitting diode (OLED) display, for example. Additionally, in one embodiment, the display 71 may be provided in conjunction with a touch-sensitive mechanism (e.g., a touch screen) that may function as part of a control interface for the connected devices.

Although the components described above have been discussed with regard to the SDM system 50, it should be noted that similar components may make up other computing devices (e.g., local control system 42, SDM nodes 52) described herein. Further, it should be noted that the listed components are provided as example components and the embodiments described herein are not to be limited to the components described with reference to FIG. 2.

Keeping the foregoing in mind, in some embodiments, the memory 66 and/or storage 68 of the SDM system 50 may include one or more software applications that may be executed by the processor 64 and may be used to access, update, monitor, and communicate with the SDM nodes 52, the industrial automation devices 20, and the like. That is, the software applications may perform some of the embodiments described below including establishing secure communications between the communicatively coupled devices. As a result, the SDM system 50 may communicatively couple to the SDM nodes 52 or other suitable devices via a direct connection between the devices or, in some embodiments, via certain gateway devices.

With this in mind, the SDM system 50 may securely monitor one or more properties of the industrial automation devices 20. By way of example, FIG. 3 provides an example direct-to-cloud system 70 that details communication operations between SDM nodes 52 incorporated or integrated with various industrial automation devices 20, a security cloud services platform (e.g., SDM system 50), and data sources 72, which may include a database that includes configuration or other type of data, cloud computing systems that manage the firmware and software of the industrial automation devices 20, and the like.

The SDM system 50 may include a cloud service that may be responsible for maintaining a registry of user tenants (e.g., tenant may include a private secured organizational boundary that may contain one or more users, and one or more unique managed devices) and devices that may be authorized to communicate with each other. The SDM system 50 may then coordinate with the data sources 72 (e.g., part of registry of user tenants) to provide the corresponding firmware, software applications, and other applications that may be executed by the respective industrial automation devices 20. In this way, the SDM system 50 may provide a service that allow users to manage device deployments of products manufactured by a particular manufacturer.

With this in mind, in one embodiment, the SDM node 52 may include a microcontroller unit (MCU), such as an integrated circuit (IC) chip, a system-on-chip (SoC), or other suitable processing system that may be integrated into the industrial automation device 20 (e.g., drive 74). The SDM node 52 may monitor the software or processes implemented by the respective industrial automation device 20. If the industrial automation device 20 is accessed remotely or locally and has its software modified or updated, the SDM node 52 may automatically detect the change and reconfigure the industrial automation device 20 (e.g., via the data sources 72) to maintain the previously specified configuration, as regulated by the SDM system 50. That is, the SDM node 52 may indicate to the SDM system 50 a type of the industrial automation device 20 that it is integrated with and report to the SDM system 50 various operating parameters (e.g., firmware version, software applications installed therein, device settings, alarm settings) related to the respective industrial automation device 20.

The SDM system 50 may maintain a record of expected operating parameters for various industrial automation devices 20 or may query the data sources 72, which may include expected operating parameters for the respective industrial automation device 20. If the SDM system 50 detects that the received operating parameters do not match the expected operating parameters, the SDM system 50 may push an update to the respective SDM node 52, such that the SDM node 52 may update the respective operations (e.g., firmware, software, settings). In this way, the SDM system 50 may continuously (e.g., periodically, in response to detection of anomaly) maintain the operations of the industrial automation devices 20. Indeed, as will be described in more detail below, the SDM system 50 may manage the operations of the industrial automation devices 20 while maintaining a secure communication channel therebetween. As such, the SDM node 52 may allow the industrial automation device 20 to perform certain operations (e.g., anomaly detection, modifications) and update the SDM system 50 with updated configuration or parameters used to perform the operations in a secure network.

It should be noted that the SDM node 52 may be integrated in each individual device, such that each individual device may provide data directly to the SDM system 50. In addition, the SDM node 52 may be integrated into one device (e.g., gateway device), such that it may communicates with multiple devices (e.g., using a gateway mode).

Keeping the forgoing in mind, the SDM system 50 may provide secure cloud platform services for the SDM nodes 52 to ensure that secure communication channels are maintained between the SDM nodes 52, the SDM system 50, the data sources 72, and the like. By way of operation, the content or application executed by the SDM nodes 52 may first be registered with the SDM system 52 before deployment. That is, the SDM system 50 may receive an authorization or an indication of expected content for various types of SDM nodes 52 to corresponds to different types of industrial automation devices 20 via user input, encrypted protocol, or any suitable technique (e.g., verified serial number, metadata). In some embodiments, the SDM system 50 may retrieve the content from data sources 72, which may be managed by a third party (e.g., manufacturer of industrial automation devices 20). The content (e.g., firmware, software) stored in the data sources 72 may be managed by the third party to ensure that the integrity of the stored content. In any case, the SDM system 50 may communicate with the SDM nodes 52 after confirming that the respective devices are authorized to communicate with the SDM system 50 and after the SDM system 50 establishes a secure communication channel between the communicatively coupled devices. In this way, the SDM system 50 may deploy content to the SDM nodes 52 in a secure manner without involving any additional infrastructure (e.g., encryption, firewall, routers, software) within the industrial automation devices 20 or any intervening components. For instance, an edge SDM node 52 (e.g., within data sources 72) that provides the access rights to other SDM nodes 52 does not include additional layers of encryption or protection when facilitating communications between each other. Instead, a direct device-tocloud infrastructure is implemented in a secure fashion because the SDM system 50 serves as a management role for infrastructure to ensure that deployed content is authentic.

In some embodiments, the SDM system 50 is agnostic to the type of data (e.g., application content) or content that is deployed, so long as it is registered with the SDM system 50. The registration of the content may involve providing an association between the respective authorized content a respective industrial automation device 20 that the content is used to manage. As such, the SDM system 50 may deploy software in the industrial space (e.g., OT network), while separately managing the security of the respective infrastructure.

Figure 4:
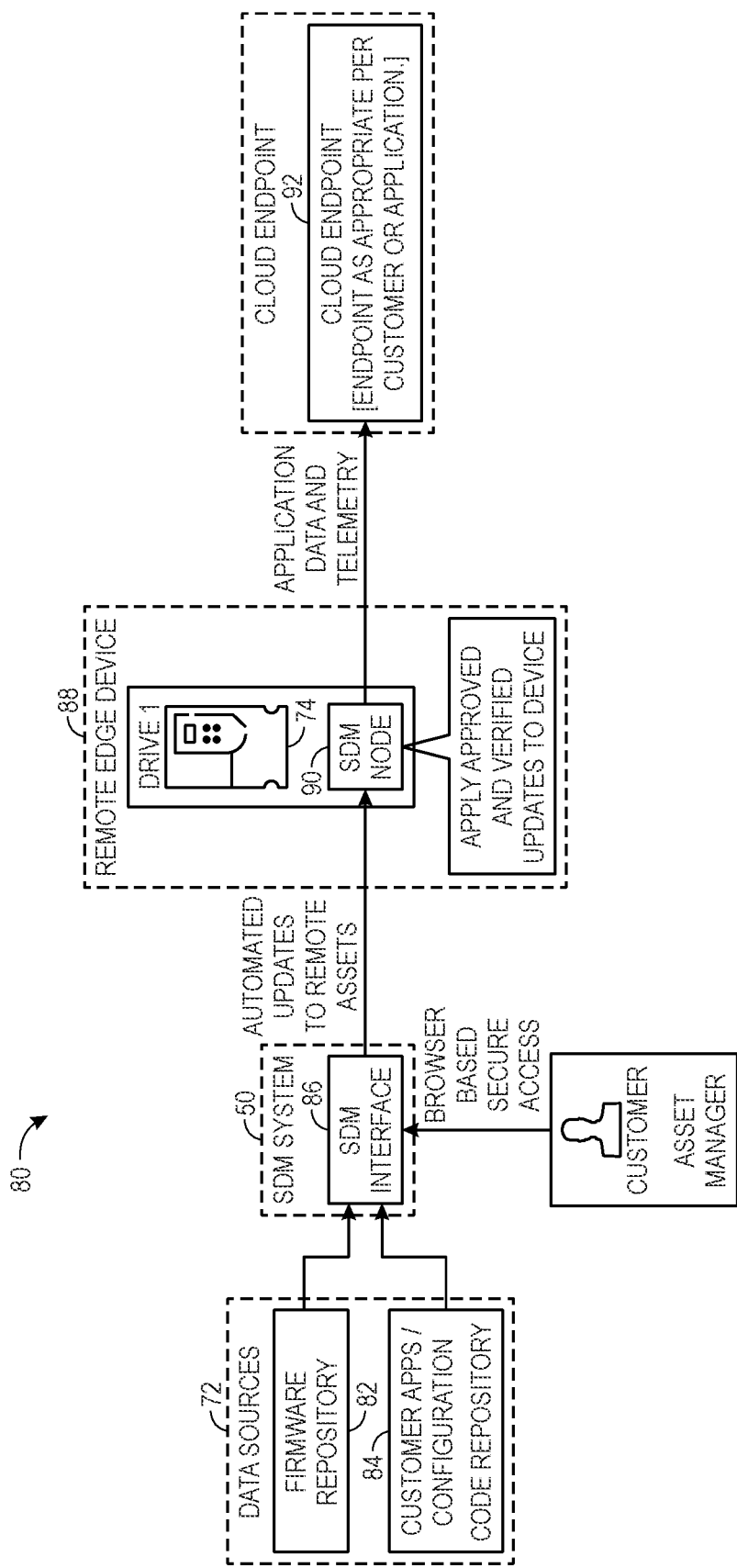
FIG. 4 is a block diagram illustrative of direct communications between the secure deployment management system and other components of the industrial system, in accordance with an embodiment.

Keeping the foregoing in mind, FIG. 4 illustrates a block diagram of a communication network 80 that depicts communication between the data sources 72, the SDM system 50, and other components that may be part of the industrial automation system 10. As shown in FIG. 4, the SDM system 50 may serve as the secure cloud services platform that may be connected to the data sources 72, which may include a firmware repository 82 that includes firmware updates, a code repository 84 that includes source code for customer applications/configuration that may be executed on the industrial automation devices 20, and the like. The data sources 72 may maintain the genuine or a specified version of firmware for a respective industrial automation device 20, a set of applications that may be associated with the respective industrial automation device 20, and the like. As discussed above, the SDM system 50 may detect new updates in the data sources 72 and may deploy these updates directly to the SDM nodes 52 to update the respective industrial automation devices 20.

In some embodiments, and a user may interact with a secure deployment management system (SDMS) interface 86 (e.g., graphical user interface, input/output connected device) to select whether to deploy the updates to respective industrial automation devices 20. In addition, the user may configure the data sources 72 to include updated data, approve or reject updates automatically generated by the SDM system 50 or provided by others, schedule deployments, monitor device states, and the like via the SDMS interface 86. In this way, the user may define the data packages that may be pushed to the SDM system 50 and thus deployed to the SDM nodes 52. In some embodiments, the user may optionally request that packages sent from the data sources 72 are digitally signed by the data sources 72 (e.g., server) to provide added security measures, which the SDM system 50 may verify are undertaken before deploying the packages to another SDM node 52.

In operation, after receiving authorized and acceptable data packages from the data sources 52, the SDM system 50 may automatically deploy the data packages to the respective SDM node 52 associated with the industrial automation device 20 (e.g., drive 74). The SDM node 52 may install the approved and verified data package on its storage or on a control system for operating the respective industrial automation device 20. However, it should be noted that the industrial automation device 20 (e.g., drive 74) may avoid communicating data to any network because the SDM node 52 facilitates the communication operations in a data agnostic fashion. That is, the SDM node 52 may send and receive data that it may not be able to execute. Nevertheless, the industrial automation device 20 may execute the respective data package while avoiding performing additional authentication or security protocol operations prior to execution, thereby improving the operation (e.g., power and time efficiency) of the industrial automation device 20.

The SDM system 50 may also route data to an edge device 88 (e.g., gateway, router). The edge device 88 may be integrated with the industrial automation device 20, such as the drive 74, as shown in FIG. 4. In some embodiments, the SDM system 50 may send automated updates to remote assets, such as the remote edge device 88, via the SDM node 90. The remote edge device 88 may include any suitable network-capable device that may be accessible to a communication network. As such, the remote edge device 88 may be part of a separate network, as compared to the data sources 72. In some embodiments, the SDM node 92 that may be part of the remote edge device 88 and integrated with (e.g., SoC installed thereon) the drive 74. As such, the SDM node 92 may also data (e.g., application data, telemetry data) acquired from the drive 74, the SDM system 50, the data sources 72, and the like to a cloud endpoint 92 that may be part of another cloud environment. Indeed, the data routed to the cloud endpoint 90 may be defined by the user via the SDMS interface 86 or defined as part of the applications executing on other SDM nodes 52, industrial automation devices 20, or the like.

The remote edge 88 may interact with related cloud services and targeted automation devices. As such, the remote edge 88 may be secured via mutual certificates acquired through a hardware-based attestation process ensuring easy onboarding of new devices, which would be associated with a user's tenant, as managed by the SDM system 50. The remote edge 88 may be positioned within a threshold distance or network latency of an industrial automation device 20 (either on an adjacent computer or on an options card or similar in the device), but still independent of the compute used to operate the respective industrial automation device 20. In this way, the remote edge 88 may function to ensure that the automation device is in the state defined by the SDM system 50, which may include applying firmware or configuration changes approved by the customer, or reverting changes if an unauthorized change is detected.

As shown above in FIG. 4, it should be noted that the embodiments described herein may incorporate the SDM node 52 in a variety of ways. For instance, an integrated circuit (IC), system-on-chip (SoC), or other suitable processing circuitry may be integrated or disposed directly on a product electronic board that manages the operations and communications of a corresponding industrial automation device 20. In some embodiments, the IC may be incorporated into a communications circuit board to facilitate the secure communication channels described above.

In addition, an option card may be provided as an input/output module that may be added to a control system for managing operations and communications of a corresponding industrial automation device 20. Input/output (I/O) modules may be added or removed from a control system via expansion slots, bays, or other suitable mechanisms. In certain embodiments, the I/O modules may be included to add functionality to the control system or to accommodate additional process features. With this in mind, the SDM node 52 may be provided on an option I/O module card that may facilitate communication between the control system, the SDM system 50, the data sources 72, and the like.

In some embodiments, the I/O modules may serve as an electrical interface to the control system. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems. By incorporating the SDM node 54 on these types of communication modules, the SDM system 50 may securely manage communications to the respective industrial automation device 20 via the option card. It should be noted that the SDM node 54 may be integrated into any suitable I/O module such as a power module for providing power to devices, a power monitoring module for monitoring electrical properties, a sensor module for interfacing with sensors, and the like manufactured by a variety of different manufacturers.

In both of the above examples, the SDM node 52 may facilitate communication with one corresponding industrial automation device 20. In some embodiments, the SDM node 52 may be provided via an IC mounted on a product board of a gateway device that facilitates communication to a number of industrial automation devices 20.

Figure 5:
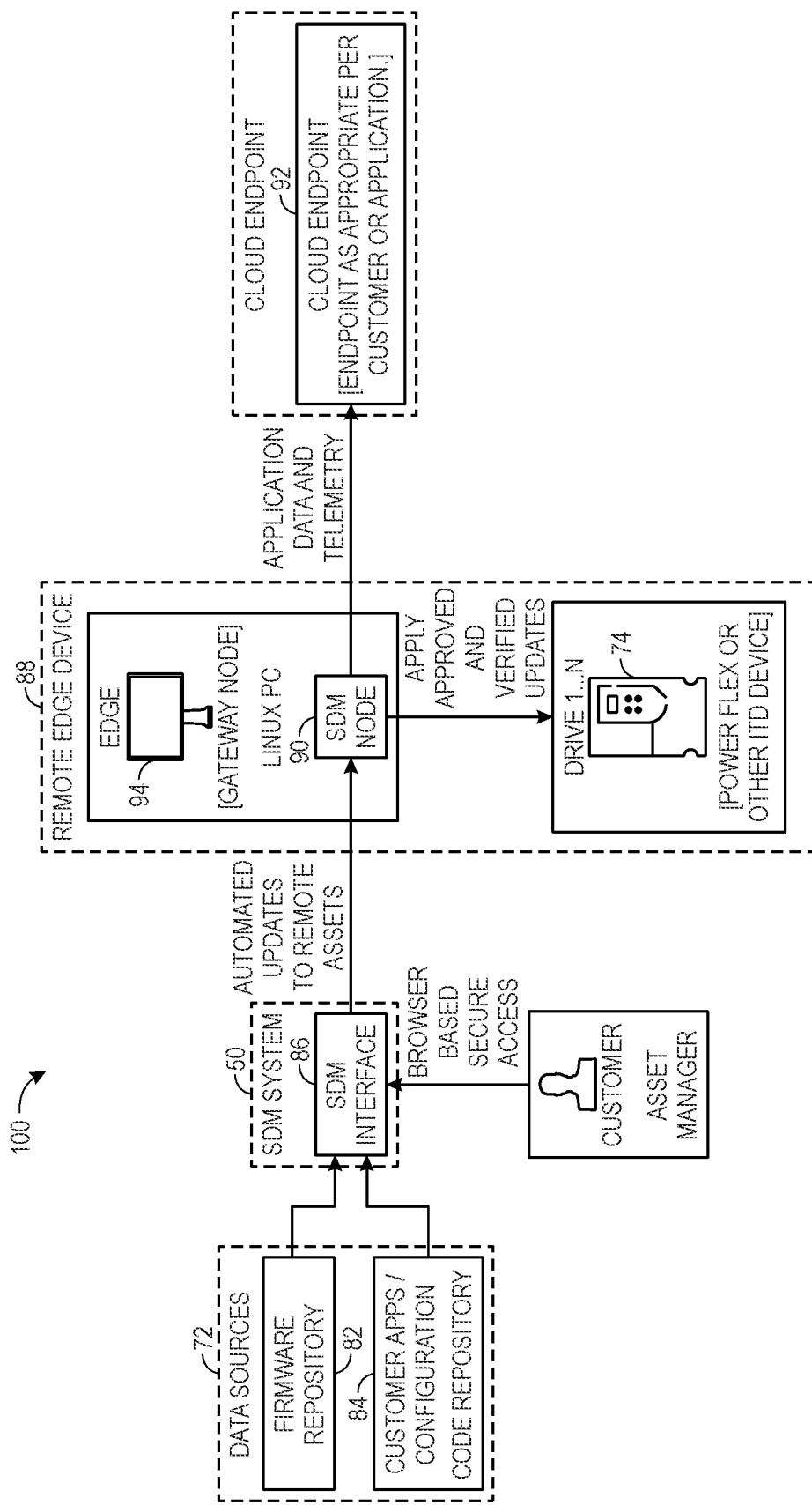
FIG. 5 is a block diagram illustrative of indirect communications between the secure deployment management system and other components of the industrial system via a gateway or intermediate device, in accordance with an embodiment.

Keeping this in mind, FIG. 5 illustrates another embodiment of a communication network 100 in which the SDM system 50 may communicate with the SDM node 92 that may be capable of routing communications to a number of industrial automation devices. As shown in FIG. 5, the SDM node 92 may be part of an edge computing node 94, which may include any suitable computing device (e.g., Linux PC). In this way, the SDM node 92 may not be directly integrated (e.g., included within the control circuitry) of the drive 74 and instead be integrated with the edge computing node 94. Nevertheless, the SDM node 92 may maintain secure communications with the drive 74 and route data to the drive 74 via the SDM system 50, the data source 72, and the like. In addition, additional drives or devices (not shown) may be communicatively coupled to the SDM node 92, which may facilitate secure communication to each of the other devices.

In some embodiments, the edge computing node 94 may interact with the related cloud services and communicatively coupled industrial automation devices 20. As such, the edge computing node 94 may be secured by the SDM system 50 via mutual certificates acquired through a hardware-based or software-based attestation process ensuring secure onboarding of new devices to be associated as the user's tenant. In some embodiments, the edge computing node 94 may be positioned within a proximity or threshold distance or threshold network latency of the industrial automation device 20, such as on an adjacent computing surface, an options card, or similar in the device. In any case, the edge computing node 94 may still be independent of the compute used to operate the industrial automation device 20. Instead, its function may include ensuring that the industrial automation device 20 is operating in the state defined by a corresponding cloud service of the data sources 72. That is, the edge computing node 94 may facilitate providing firmware or configuration changes approved by the customer or reverting changes if an unauthorized change is detected for one or more connected industrial automation devices 20.

By operating in any of the suitable communication networks described above, the present embodiments described herein enable the industrial automation devices 20 that may be part of an operational technology (OT) network to securely communicate within the network and perform a variety of operations to ensure that the industrial automation system 10 continues operations. To establish the secure communication channels, the SDM node 54 may register itself with the SDM system 50, which may, in turn, confirm the authenticity of the respective industrial automation device 20 and establish a secure communication channel to facilitate communications.

Figure 6:
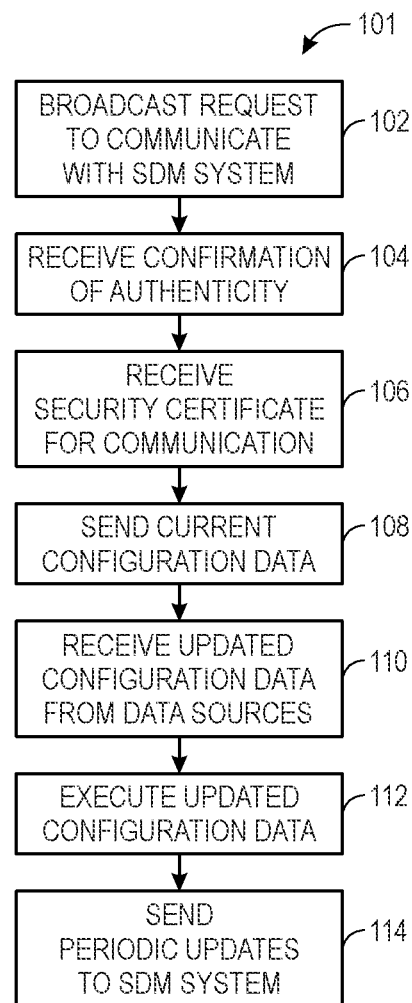
FIG. 6 illustrates a flow chart of a method in which a secure deployment management node establishes a secure communication channel with the secure deployment management system, in accordance with embodiments described herein.

For example, FIG. 6 illustrates a method 101 for the SDM node 52 to establish a secure communication channel with the SDM system 50, in accordance with embodiments described herein. Although the following description of the method 101 is described as being performed by the SDM node 52 and in a particular order, it should be understood that any suitable processing device may perform the method 101 in any suitable order.

Referring now to FIG. 6, at block 102, the SDM node 52 may broadcast a request to communicate with the SDM system 50. That is, upon initialization or receiving power (e.g., wake up mode), the SDM node 52 may broadcast one or more signals at a certain frequency or within a range of frequencies that the SDM system 50 may continuously monitor. The broadcast signals may include information related to the SDM node 52 itself, such as the serial number, a device identifier, or the like, as well as information retrieved from a connected system (e.g., product board) indicative of the industrial automation device 20 connected thereto. The SDM node 52 may thus include pre-installed software or firmware that causes the SDM node 52 to transmit beacon signals to allow the SDM system 50 to identify the presence of the SDM node 52. In some embodiments, the SDM node 52 may include hardware encoded data or features that may enable the SDM system 50 to perform hardware-based attestation processes. Indeed, the beacon signals may be transmitted in an encrypted fashion of via secured communication channels using security protocols such as converged protocols, authentication protocols, secure communication protocols, remote access security, virtual private networks, WLAN authentication, and the like. In any case, the SDM node 52 and the SDM system 50 may employ some security measures (e.g., cryptography, encryption) to ensure that the frequencies or channels used by the SDM node 52 to broadcast the initialization signals may be securely received and interpreted by only the SDM system 50.

At block 104, the SDM node 52 may receive a confirmation of authenticity from the SDM system 50. That is, the SDM system 50 may query the identification information provided by the SDM node 52 with a database, storage, or the data sources 72 to confirm that the SDM node 52 has provided identification information that matches expected identification information including receiving signals in an appropriate frequency band, packaged or encrypted in a particular fashion, and the like.

At block 106, the SDM node 52 may receive a security certificate for communication with the SDM system 50. The security certificate may include a unique certificate that enables just the SDM node 52 to communicate with the SDM system 50. The security certificate may include a secure sockets layer (SSL) certification or other encrypted link certificate that the SDM node 52 and the SDM system 50 may use to establish a secure communication channel that is resistant to hacking, eavesdropping, and other communication vulnerabilities.

At block 108, the SDM node 52 may send data accessible to the SDM node 52 to the SDM system 50. As mentioned above, the SDM node 52 may be integrated with a product board of an industrial automation device 20, an option card communicatively coupled to the industrial automation device 20, a gateway device communicatively coupled to the industrial automation device 20, or the like. As such, the SDM node 52 may receive telemetry data (e.g., automatically created data by control systems operating device via agents or protocols), operating parameter data (e.g., device settings, user defined settings), software data (e.g., installed applications, version information, firmware information), input/output connected device data (e.g., sensors, door alarms), and other data types that may be available to the industrial automation device 20. In some embodiments, the SDM system 50 may send requests to the SDM node 52 to provide a particular dataset, may specify the type of data to periodically send in the security certificate received at block 106, and the like. In addition, upon initialization, the SDM node 52 may retrieve the current configuration data that may include the software applications, firmware version, connected device data, and the like to the SDM system 50 as current configuration data. As such, the SDM system 50 may receive a real time update of the configuration data that corresponds to the current operation of the industrial automation device 20.

At block 110, the SDM node 52 may receive updated configuration data from the data sources 72 by way of the SDM system 50. That is, the SDM system 50 may receive the current configuration data provided at block 108 and determine whether an updated version is available or whether the current configuration data doesn't match an expected configuration profile for the respective industrial automation device 20. If the SDM system 50 determines that the current configuration data does not match the expected configuration data, the SDM system 50 may coordinate with the data sources 72 to retrieve the appropriate configuration data or the updated configuration data to provide to the SDM node 52 via the established secure communication channel.

At block 112, the SDM node 52 may execute, unpackage, or modify the operating parameters (e.g., settings, applications) of the industrial automation device 20 using the updated configuration data. At block 144, the SDM node 52 may send periodic updates related to the operations of the industrial automation device 20 including the existing configuration data, telemetry data, and other suitable data types that the SDM system 50 may have requested. In some embodiments, the SDM node 52 may send an update to the SDM system 50 in response to detecting a change in the configuration data as automatically implemented via software applications, manually entered via local control system input, and the like. In this way, the SDM system 50 may ensure that changes made to the respective industrial automation device 20 match the expected configuration data for the device.

Figure 7:
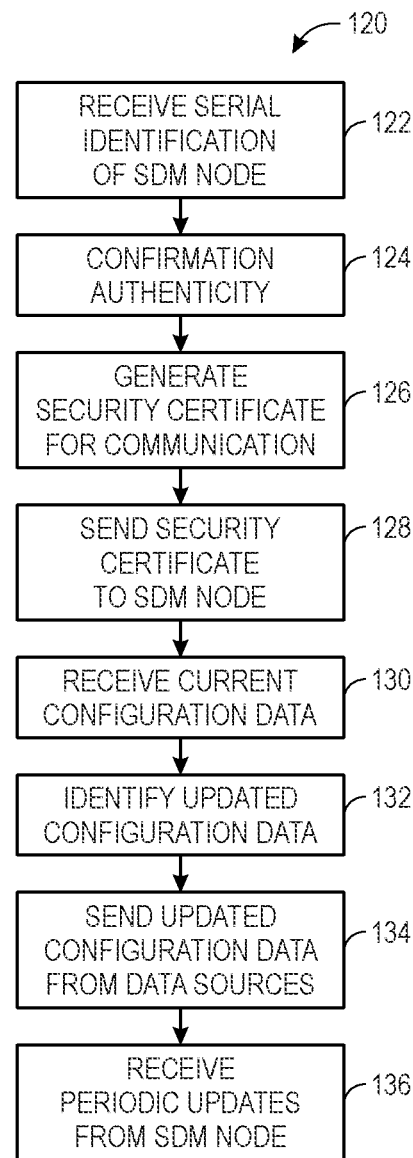
FIG. 7 illustrates a flow chart of a method for the secure deployment management system to establish a secure communication channel with the secure deployment management node, in accordance with embodiments described herein.

FIG. 7 illustrates a method 120 for the SDM system 50 to establish a secure communication channel with the SDM node 52, in accordance with embodiments described herein including the method 100 described above. Although the following description of the method 120 is described as being performed by the SDM system 50 and in a particular order, it should be understood that any suitable processing device may perform the method 120 in any suitable order.

Referring now to FIG. 7, at block 122, the SDM system 50 may receive a beacon signal or other initialization signal from the SDM node 52. The beacon signal may include serial identification information for the SDM node 52. Indeed, the SDM node 52 may be preprogrammed to include a specific identification that is preregistered with a list of SDM nodes authorized to communicate with the SDM system 50.

At block 124, the SDM system 50 may confirm the authenticity of the SDM node 52 based on the received identification information. In some embodiments, the SDM system 50 may query a list of serial numbers to determine if the identification information matches one of the listed numbers. In addition, the SDM system 50 may perform some handshake protocol that may be preprogrammed in the SDM node 52 to establish a communication connection between the two. In any case, the SDM system 50 may use any suitable encryption or verification process to confirm that the SDM node 52 is part of the platform for secure communication with the After confirming the authenticity of the SDM node 52, the SDM system 50 may, at block 126, generate the security certificate for the SDM node 52. The security certificate may be customized for the individual SDM node 52 that sent the beacon or initialization signal. That is, the security certificate may employ information (e.g., serial number, private key) only known to the SDM node 52 to activate the certificate and initialize the secure communication channel. At block 128, the SDM system 50 may send the generated security certificate to the SDM node 52.

At block 130, the SDM system 50 may receive the current configuration data from the SDM node 52 and compare the current configuration data with the expected configuration data for the respective industrial automation device. That is, the SDM system 50 may coordinate with the data sources 72 to determine if the current configuration data corresponds to a recommended configuration. In some embodiments, the data sources 72 may include computerized maintenance management systems (CMMS's) that monitors state data (e.g., run time, operating conditions, fault data) of the industrial automation devices 20, determines adjustments for the current configuration data of the industrial automation devices 20 based on predictive maintenance analysis, and provide updated configuration data for the industrial automation devices 20 based on predictive maintenance. That is, the data sources 72 may include cloud services that track the operations of similar types of devices and determines or predicts times for expected maintenance events to be performed to extend the operational functionality of the device and the respective industrial automation system 10.

By employing the data sources 72, the SDM system 50 may allow the manufacturer or some other entity to focus on maximizing the operational functionality of the industrial automation system 10, while the SDM system 50 maintains a secure communication network between the data sources 72 and the target industrial automation devices 20. Indeed, the CMMS functions provided by the data sources 72 may include prioritizing maintenance tasks, providing adjustments to operational parameters (e.g., run time, speed, temperature, other settings) to coordinate across maintenance schedule for variety of devices, manage inventory and control costs for maintenance, reduce downtime, collect use data for future analysis and determinations of more productive operations, reduce energy usage, automate work request by coordinating with messaging applications (e.g., email, text messaging, internet communication), and the like.

In addition, SDM system 50 may be bound to end points in the data sources 72, such as a CMMS productivity tool. In this way, the SDM system 50 may receive run time data from the industrial automation device 20 and source the run time data to the CMMS productivity tool, which may perform predictive maintenance functions. That is, the CMMS productivity tool may securely receive run time data and automate annunciations related to the operations of the industrial automation device 20. The annunciations may include alarm signals, a dashboard visualization, any suitable communication message, and the like.

In addition, the SDM system 50 may detect whether the current configuration does not match the expected configuration due to a local or remote user changing the configuration of the respective industrial automation device 20. In this case, the SDM system 50 may proceed to revert the configuration of the respective device back to the expected version.

By way of example, the SDM system 50 may interact with the MCU (e.g., SDM node 52) or other registered device to determine whether the device is authorized for communication with the SDM system 50. As mentioned above, each SDM node 52 may have a unique identifier (e.g., non-changeable artifact), and after the SDM node 52 is registered or claimed as a tenant of the SDM system 50, the SDM system 50 may confirm that the device is operating within parameters established for the tenant. The parameters may be defined by a manufacturer or other party and stored in the data sources 72 or other suitable storage component. For example, the SDM system 50 may confirm that the drive 74 is operating with a particular operating system and firmware version. After confirming that the device is authorized and the communication channel is secure, the SDM system 50 may transmit any applications that are associated with the tenant (e.g., drive 74) to the respective SDM node 52 to allow the tenant to perform the related tasks. For example, if the device is part of a particular program group, the SDM system 50 may execute a particular code, which may involve coordinating with the data sources 72 to deploy applications, configurations, updates, and the like to the SDM node 52 for installation on the respective devices.

With the foregoing in mind, at block 132, the SDM system 50 may identify the updated configuration data to send to the SDM node 52, such that the SDM node 52 may provide the updated configuration data to the respective industrial automation device 20 at block 134. At block 136, the SDM system 50 may receive periodic updates from the SDM node 52 representative of state data, configuration updates, or the like.

By operating within the secure infrastructure provided by the SDM system 50, the secure cloud services platform manages the integrity of the communication architecture. Meanwhile, other devices and platforms may perform stand-alone operations, send communications, and the like without performing additional processing tasks related to authenticating the integrity of the communicatively connected devices, thereby improving the computing efficiency in each of the devices performing the stand-alone operations.

For instance, after the SDM system 50 establishes the secure network of registered devices, the SDM system 50 may coordinate with other cloud services, the SDM nodes 52, and the data sources 72 to perform various tasks such as firmware management and configuration management. Indeed, in this way, the SDM system 50 may facilitate the coordination and communications between third-party entities and the SDM nodes 52 for a variety of data providers. That is, since the SDM system 50 is agnostic to the data/packages being sent, the SDM system 50 may coordinate communication of data packages so long as the tenant devices are registered and secured with an appropriate communication channel. After confirming that the network is secure, the SDM node 52 may coordinate with a control system of the respective industrial automation device 20 to perform the tasks associated with the received packages.

With the foregoing in mind, the SDM system 50 also provide for secure access of monitoring or configuration of the industrial automation device 20 via a respective human interface module (HIM). That is, authorized users may modify the operating parameters of the industrial automation system via a local HIM attached to the device or via a remote HIM indirectly coupled to the device, such that the SDM system 50 may receive the updated configuration data via the secure channel established by the SDM node 52. If the updates are authorized or acceptable, the updated configuration data for the specific industrial automation device 20 may be stored in the data sources 72 or other copycat database to provide unique backup storage for user updated configuration. As such, the SDM system 50 may maintain a replica database to provide backup information for the specifically tuned parameters provided by an authorized user at the device. Indeed, since the updated configuration data is communicated via the SDM system 50 and the SDM node 52, the replica data may be trusted as being representative of the true state of the respective device.

Figure 8:
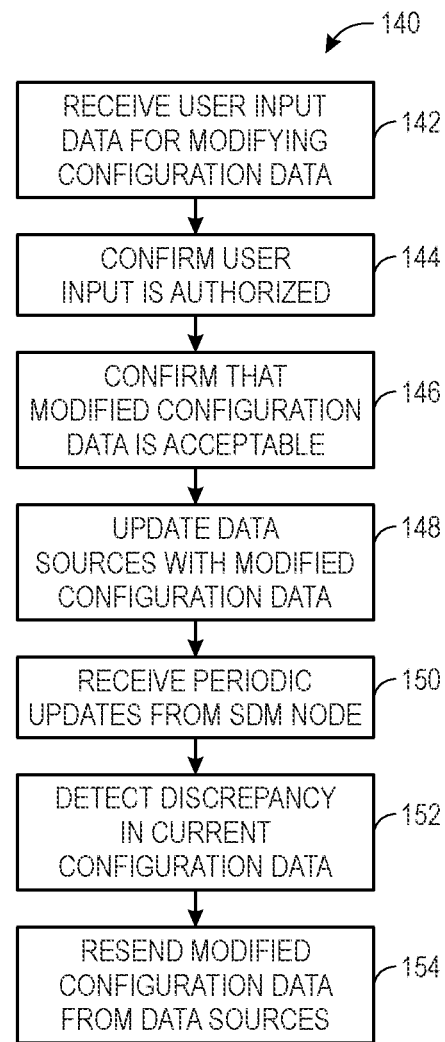
FIG. 8 illustrates a flow chart of a method for tracking human interface module (HIM)-provided modifications via the secure deployment management system, in accordance with embodiments described herein.

With the foregoing in mind, FIG. 8 illustrates a method 140 for tracking HIM-provided modifications via the SDM system 50, in accordance with embodiments described herein. Although the following description of the method 140 is described as being performed by the SDM system 50 and in a particular order, it should be understood that any suitable processing device may perform the method 140 in any suitable order in accordance with the embodiments described herein.

At block 142, the SDM system 50 may receive user input data provided via a HIM (e.g., local or remote) by a user. The user input data may be related to modifying configuration data of a respective industrial automation device 20. That is, the modified configuration data may include changes made to the firmware of the device, applications stored on the device, applications being executed on the device, settings or parameters for the applications of the device, operational parameters for the devices, I/O data received by the device, and the like. In some embodiments, the user input data may be provided with user identification data or user authorization information (e.g., password, keycard, multi-factor authentication).

At block 144, the SDM system 50 may confirm that the user input is authorized. That is, the SDM system 50 may determine whether the user identification data or user authorization information meets a threshold security level for performing the respective modifications. The authority or security levels for different types of modifications may be accessible to the SDM system 50 via lists stored in storage, the data sources 72, or the like.

In addition, the SDM system 50 may, at block 146, confirm that the modified configuration data is acceptable. That is, in some embodiments, the data sources 72 (e.g., CMMS) may manage the configuration of various devices and track certain device configurations that may cause problems with the respective devices or connected devices. As such, if the data sources 72 or other data accessible to the SDM system 50 indicates that the modified configuration data is unacceptable, the SDM system 50 may send the original configuration data to the respective SDM node 52 and revert back to the approved configuration.

If the modified configuration data is confirmed as being acceptable, the SDM system 50 may, at block 148, update the data sources 72, a replica or copycat database, or other suitable storage of the modified configuration data. As such, the SDM system 50 may send the modified configuration data via a secure channel established with the SDM system 50 and the corresponding storage component as described above.

At block 150, the SDM system 50 may receive periodic updates from the SDM node 52 indicative of the current configuration data of the respective device. As mentioned above, in some embodiments, the SDM node 52 may automatically send the current configuration data after detecting a change in operation, configuration, or the like.

At block 152, the SDM system 50 may determine or detect whether there is a discrepancy between the current configuration data and the modified configuration data. That is, if the industrial automation device 20 resets or is replaced with a replacement device, the SDM system 50 may update the current configuration data with the modified configuration data uniquely provided for that particular device. As such, the SDM system 50 may maintain backup storage profiles for various devices to ensure that the devices operate as per the acceptable user provided parameters. As a result, the SDM system 50 may restrict remote cloud configuration or local configuration for authorized users. Moreover, since the communications are managed by the SDM system 50, remote access to the device will be monitored and coordinated based on security protocols administered by the SDM system 50. Further, unique and individual updates for specific devices are communicated and stored via secure communication channels that provide encrypted device configuration storage that also may allow for direct device download, as managed by the SDM system 50. If, at block 152, the SDM system 50 detects a discrepancy between the current configuration data and the modified configuration data, the SDM system 50 may, at block 154, resend the modified configuration data stored in the replica database or data sources 72 at block 148.

In addition to managing the configuration changes to the devices, the SDM system 50 may facilitate secure recording access for logging anomaly data and the like. That is, faults or unexpected conditions detected by the industrial automation device 20 may be securely communicated to the SDM system 50 for storage and analysis. In addition, telemetry data may be provided directly to the SDM system 50 via the SDM node 52 to allow the industrial automation device 20 to directly access the cloud services to maintain a record or log of data related to a fault, receive updated configuration data in view of the log of data, and the like.

Figure 9:
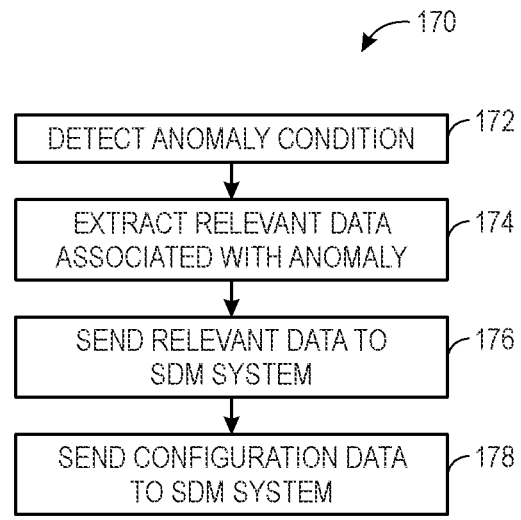
FIG. 9 illustrates a flow chart of a method in which a secure deployment management node may send relevant data associated with a detected anomaly to the secure deployment management system, in accordance with embodiments described herein.
Figure 10:
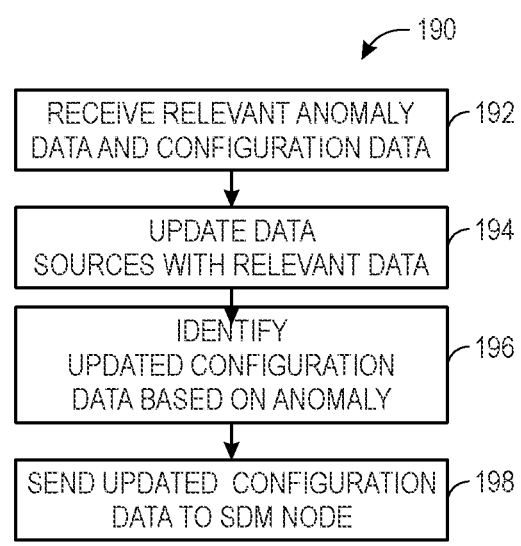
FIG. 10 illustrates a flow chart of a method in which the secure deployment management system receives relevant data from the secure deployment management node and coordinates with data sources to provide updated configuration data to the respective industrial automation device, in accordance with embodiments described herein.

With this in mind, FIG. 9 illustrates a method 170 in which the SDM node 52 may send relevant data associated with a detected anomaly to the SDM system 50. In the same manner, FIG. 10 illustrates a method 190 in which the SDM system 50 may receive the relevant data and coordinate with the data sources 72 or other cloud service to provide updated configuration data to the respective industrial automation device 20 to assist the device in avoiding the fault or unexpected conditions. Although the following descriptions of the method 170 and the method 190 are described as being performed by the SDM node 52 and the SDM system 50, respectively, and in certain orders, it should be understood that any suitable processing device may perform the method 170 and the method 190 in any suitable order in accordance with the embodiments described herein.

Referring first to FIG. 9, at block 172, the SDM node 52 may detect an anomaly condition. The anomaly condition may include alarm notifications, fault conditions, detected security threats, sensor data above or below respective thresholds, and the like. At block 174, in response to detecting the anomaly condition, the SDM node 52 may extract relevant data that may be associated with the anomaly condition from the industrial automation device 20. That is, in some embodiments, the SDM node 52 may retrieve data stored in the industrial automation device 20 that was generated, received, or stored a certain amount of time prior to detecting the anomaly condition, an additional amount of time after detecting the anomaly condition, and the like. In addition, the relevant data may include sets of data that the SDM node 52 has associated as being correlated to other sets of data.

In some embodiments, the SDM node 52 may send the anomaly condition to the SDM system 50, such that the SDM system 50 may query the data sources 72 to determine the relevant data. In turn, the SDM system 50 may provide a request for the relevant data to the SDM node 52, which may retrieve the relevant data from the industrial automation device 20.

After collecting the relevant data, the SDM node 52 may, at block 176, send the collected data to the SDM system 50. In addition, at block 178, the SDM node 52 may send the current configuration data to the SDM system 50, such that the SDM system 50 may provide the relevant data and the current configuration data to the data sources 72 for analysis.

Referring now to FIG. 10, at block 192, the SDM system 50 may receive the relevant anomaly data and the configuration data from the SDM node 52, as described above. At block 194, the SDM system 50 may update the data sources 72 with the relevant data and the configuration data. In turn, the data sources 72 may analyze the data, as compared to other collected data from other similar devices, to determine updated configuration data to address the anomaly condition.

At block 196, the SDM system 50 may identify or be provided the updated configuration data to address the anomaly condition. In some embodiments, the data sources 72 may employ machine learning or artificial intelligence algorithms to identify patterns in the relevant data as compared to other collected data from other devices to identify the updated configuration data. The data sources 72 may provide the updated configuration data to the SDM system 50, which may send the updated configuration data to the SDM node 52 at block 198. The SDM node 52 may, in turn, update the operation of the industrial automation device 20 using the updated configuration data to resolve the anomaly condition.

By employing the methodologies and systems described herein, the SDM system 50 provides secure remote accessibility to toolsets that are managed and produced by third parties or entities separate from managing the communications between devices. Further, the SDM system 50 may provide remote secure, authenticated, and authorized monitoring from any communication network, while providing remote diagnosis of devices in geographically remote areas through software tools provided via the data sources. Further, the SDM system 50 enables secure encrypted backup and remote centralized storage of device configuration data through mobile devices, as well as online validation of authentic device firmware or software applications and localized control programming. In addition, CMMS tools for monitoring device availability and optimization through geographically remote located devices is further leveraged by providing secure communications between the data sources 72 and the industrial automation devices 20. Moreover, the SDM system 50 allows segregation of control and monitoring systems from communication systems allowing each respective system to coordinate the efficient operations of their respective tasks.

Firmware and Configuration Management

As mentioned above, the SDM system 50 may coordinate with the data sources 72 to push firmware updates, resolve unexpected installations or modifications, and the like for the industrial automation devices 20 via the SDM nodes 52. In addition, the data sources 72 may include a cloud service that maintains a security vulnerability list that is periodically updated to include security risks and vulnerabilities that may be present or newly identified. For example, the industrial automation device 20 could receive malicious data from an external network and communicate the malicious data to other industrial automation devices 20 in the industrial automation system 10. The spread of malicious data through the industrial automation system 10 could then cause a variety of security issues in the industrial automation system 10, such as loss of control of certain functionality to installation of malware on industrial automation devices 20 to a complete shutdown of the industrial automation system 10. However, by coordinating communication operations via the SDM system 50, which may regularly scan or vet communications for vulnerabilities that are present on the security vulnerability list, the SDM system 50 may proactively prevent malicious communications from being transmitted or received. As a result, the malicious data may be effectively isolated and quarantined by the SDM system 50.

As such, the SDM system 50 may maintain a list of the industrial automation devices 20 and the current configuration data being executed on the respective devices, including firmware and software versions. The SDM system 50 may regularly receive updates related to the configuration data of the industrial automation devices 20 and cross reference the configuration data with any security threats that may be related to those specific devices, the configuration data settings, and the like. If any security threats are detected for the industrial automation devices 20, the SDM system 50 may deploy updated configuration data, isolate the industrial automation device 20, or perform some other action (e.g., send notification, annunciation) in response to detecting the threat.

Figure 11:
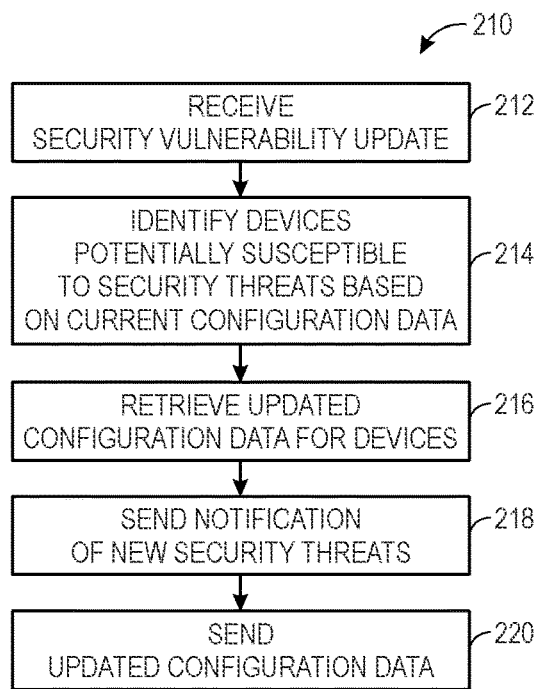
FIG. 11 illustrates a flow chart of a method for managing security vulnerabilities, in accordance with embodiments described herein.

With this in mind, FIG. 11 illustrates a flowchart of a method 210 for managing security vulnerabilities, in accordance with embodiments described herein. Although the following description of the method 210 is described as being performed by the SDM system 50 and in particular order, it should be noted that any suitable computing device may perform the method 210 in any suitable order.

Referring now to FIG. 11, at block 212, the SDM system 50 may receive one or more security vulnerability updates of a security vulnerability list from one or more data sources. In some embodiments, the SDM system 50 may monitor certain electronic resources (e.g., websites, social media sites, webservers) to detect new security vulnerabilities. The security vulnerabilities may include any malicious and non-malicious types of vulnerabilities such as malware attacks (e.g., virus, worm, trojan, ransomware, spyware, adware, fileless malware), social engineering (e.g., baiting, pretexting, phishing), man-in-the-middle (e.g., spoofing, eavesdropping, data hijacking), denial-of-service (e.g., HTTP flood DDoS), injection (e.g., code injection), and the like. In some embodiments, a third party entity may maintain a database of known security threats (e.g., security vulnerability list) and an indication of the devices targeted by the security threats.

At block 214, the SDM system 50 may identify certain industrial automation devices 20 that may be susceptible to security threats that may be part of the security vulnerability list based on the current configuration data of the respective devices. That is, as mentioned above, the SDM system 50 may periodically receive updates related to the current configuration data being executed (e.g., in runtime) for the industrial automation devices 20. Using the current configuration data and the security vulnerability list, the SDM system 50 may identify the industrial automation devices 20 that may be vulnerable to one of the security threats. Indeed, the industrial automation devices 20 may be vulnerable to a security threat when the current configuration data does not include safeguards against the security threat.

In addition, the previously issued security certificate between the corresponding SDM node 52 and the SDM system 50 may not account for the security threat. As such, the SDM system 50 may identify any security certificates that may be active and vulnerable to the security threats.

At block 216, the SDM system 50 may retrieve updated configuration data for the identified devices. In some embodiments, the data sources 72 may continuously generate updated configuration data to address various security threats, improve system operations, or the like. As such, the SDM system 50 may retrieve the updated configuration data from the data sources in response to identifying the devices at block 214. In some embodiments, the updated configuration data may include metadata or associated information that indicates the security threats that are addressed by the updated configuration data. If the updated configuration data does not address the security threat, the SDM system 50 may coordinate with the data sources 72 to provide a notification requesting the update. In addition, the SDM system 50 may send a notification to the identified devices indicative of the security vulnerability via the SDM node 52. As such, the industrial automation device 20 may present a notification on a display or other suitable device to enable personnel working with the device to be aware of the potential threat. Further, in some embodiments, the SDM system 50 may generate an updated security certificate to prevent communications that may include the detected threat.

At block 218, the SDM system 50 may send a notification of the security threats to the CMMS productivity tool of the data sources 72. As such, the CMMS productivity tool may send notifications to related personnel to initiate a fix to address the security threat. In some embodiments, a notification may be sent to the SDM system 50 after the security threat is addressed in updated configuration data.

At block 220, the SDM system 50 may send the updated configuration data to the respective industrial automation device 20 via the SDM node 52 as described above. In this way, the updated configuration data may safeguard the industrial automation device 20 to be susceptible to the security threat. In addition, the SDM system 50 may also send an updated security certificate to a corresponding SDM node 52, such that a new communication session or channel is established using the newly provided security certificate. As such, the SDM system 50 and the SDM node 52 may monitor communications to filter and reject communications or data packets that may include the security threat.

It should be noted that each of the communications transmitted by the SDM system 50 and received by the SDM node 52 may be tracked with an audit history. That is, all deployments from the SDM system 50 may be logged with information related to the individual or entity that authorized the deployment, a time that the deployment was authorized, a time that the deployment was pushed, a time that the deployment was applied to the device, and indication of success or failure of deployment, a number of retries, and the like. In this way, the SDM system 50 may provide an audit trail to identify potential security lapses or issues.

In some embodiments, the security vulnerabilities may include a variety of security threats including detecting outdated software version, unauthorized software or firmware, unauthorized users that deploy software, unauthorized modifications to firmware or software, incompatible software or firmware versions with respect to other connected devices, and the like. Indeed, the method 210 may include monitoring for these scenarios and providing updated configuration data or reverting back to authorized configuration data. As a result, the SDM system 50 may provide the ability to securely apply firmware and monitor firmware version of remote devices, verify the authenticity of Firmware (e.g., via signed packages exchanged with the SDM node 52), allowing deployment that is initiated by authorized a user, only allowing deployment to be performed from pre-approved devices or IP addresses, and the like.

With the foregoing in mind, in some embodiments, the remote edge device 88 may monitor configuration data changes that are not pushed by the SDM system 50. That is, the remote edge device 88 may monitor and detect changes made to the configuration data of the industrial automation device 20 that are not preceded by a push of configuration data to the industrial automation device by the SDM system 50. Indeed, the remote edge device 88 may have access to local data sources that may not be accessible to other networks. As such, the remote edge device 88 may detect the presence of an individual with the industrial automation device 20 via sensors, inputs provided to the HIM of the industrial automation device 20, and other activities that may not be communicated across the network. In these instances, if the configuration data being executed on the industrial automation device 20 is changed without receiving updated configuration data from the SDM system 50, the remote edge device 88 may request that the SDM system 50 provide the approved or expected configuration data to the industrial automation device 20 via the SDM nodes 52. In this way, the SDM system 50 may monitor for tamper detection and automatically rollback the configuration data to the last good or approved state. In addition, the remote edge device 88 may coordinate with the SDM system 50 to alert the CSSM productivity tools, such that other users are informed of the potentially unauthorized or faulty software/configuration changes.

Figure 12:
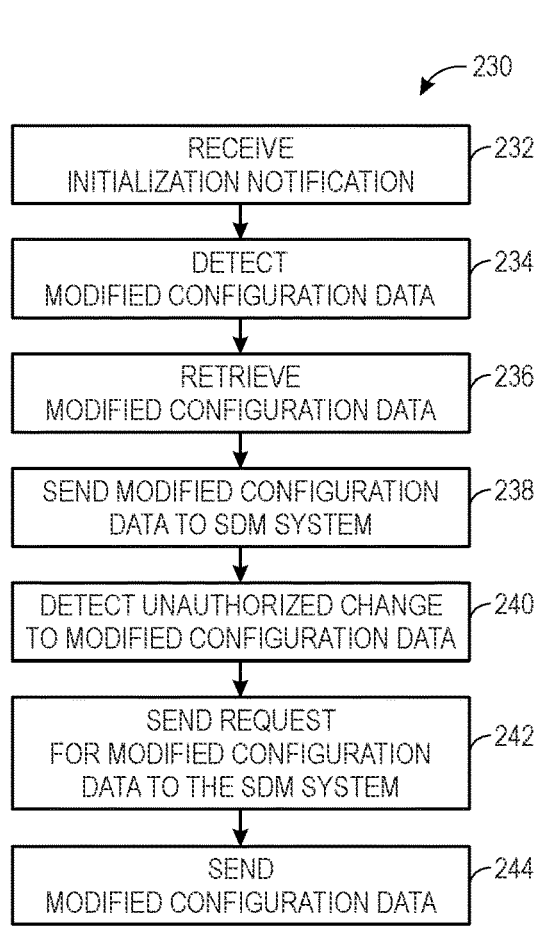
FIG. 12 illustrates a flow chart of a method for automatically reverting configuration data of industrial automation devices, in accordance with embodiments described herein.

By way of example, FIG. 12 illustrates a flow chart of a method 230 for automatically reverting configuration data of the industrial automation devices 20, in accordance with embodiments described herein. Although the following description of the method 230 will be discussed as being performed by the remote edge device 88, it should be noted that the method 230 may be performed by any suitable computing device that may monitor local operations and data. Moreover, although the method 230 is described in a particular order, the method 230 may be performed in any suitable order.

Referring now to FIG. 12, at block 232, the remote edge device 88 may receive an initialization notification from the industrial automation device 20. In some embodiments, the communications between the remote edge device 88 and the industrial automation device 20 may be facilitated via the SDM node 52 or via a direct connection between the two devices. The initialization notification may indicate that the industrial automation device 20 has been powered on for initial configuration, operating in a commissioning or modification mode based on user inputs (e.g., authorized user), and the like. As such, the industrial automation device 20 may expect to receive user inputs that may be related to initialization or commissioning, such that the industrial automation device 20 is tuned or programmed to perform its operations within the industrial automation system 10 in conjunction with other industrial automation devices 20. The initialization notification may be transmitted by the industrial automation device 20, the SDM node 52 present on the industrial automation device 20, or the like.

After receiving the initialization notification, the remote edge device 88 may, at block 234, receive or detect a modification or change to the configuration data of the industrial automation device 20. That is, the remote edge device 88 may detect changes entered via user input to the industrial automation device 20 by monitoring the operations (e.g., telemetry data, user inputs) performed on the industrial automation device 20. In some embodiments, the remote edge device 88 may receive data related to the operation of the industrial automation device 20 from other sensors and components that may measure properties (e.g., output, voltage) of the industrial automation system 10. If the data related to the operation of the industrial automation device 20 changes, the remote edge device 88 may determine that the industrial automation device 20 received a change to the configuration data that it is executing, thereby causing a change in the operation in the corresponding industrial automation device 20, the industrial automation system 10, and the like.

At block 236, the remote edge device 88 may retrieve the modified configuration data from the industrial automation device 20. In some embodiments, the remote edge device 88 may send a request to the SDM node 52 that is associated or integrated with the industrial automation device 20 to retrieve the modified configuration data from the device. The modified configuration data may include a list of changes or alterations made to the previously installed configuration data, the entire modified configuration data, or the like.

At block 238, the remote edge device 88 may transmit the modified configuration data to the SDM system 50 via a corresponding SDM node 52 or the remote edge device 88, itself, if the SDM system 50 established a secure communication channel therewith. As such, the SDM system 50 may store the modified configuration data with the data sources 72 or other suitable storage component. In some embodiments, the SDM system 50 may perform a compatibility check to determine whether the modified configuration data is compatible with the corresponding industrial automation device 20 in which it is installed, other industrial automation devices 20 in the industrial automation system 10, or the like. In this way, the SDM system 50 (e.g., coordinating with the data sources 72) may prevent any modifications that take place with the industrial automation device 20 that may be incompatible with other connected devices.

In some embodiments, if the modified configuration data is received by the remote edge device 88 within some threshold amount of time after the initialization notification is received, the remote edge device 88 and the SDM system 50 may accept the modified configuration data as data updated during commissioning. That is, during commissioning, a user may make adjustments to allow the respective industrial automation device 20 to operate within its respective environment. However, after the threshold amount of time or after receiving an indication that the industrial automation device 20 is operating in a run mode, the remote edge device 88 may detect changes made to the configuration data as potential errors.

As such, at block 240, the remote edge device 88 may detect an unauthorized change to the modified configuration data that is received after the initialization or commissioning period. In some embodiments, the changes may be received via user input at the industrial automation device 20 and detected by the remote edge device 88 via monitoring of the industrial automation device 20. In addition, the remote edge device 88 may detect the change in the configuration file based on changes to the operations, measurements, or data related to the operation of other industrial automation devices 20.

At block 242, the remote edge device 88 may send a request for the modified configuration data to the SDM system 50. The modified configuration data may correspond to the version sent to the SDM system 50 at block 236. At block 244, the remote edge device 88 may receive the modified configuration data or the configuration data that does not include the changes detected at block 238 and send the modified configuration data to the industrial automation device 20. As should be understood, the communications that the remote edge device 88 performs with the SDM system 50 may utilize the secure communication channel established by the SDM system 50. In this way, the remote edge device 88 may monitor the industrial automation device 20 and ensure any configuration changes not pushed via SDM system are reverted to the configuration stored in data sources 72, which may be pinned or defied to the specific device. This operating model is consistent with ongoing device configuration management after initial commissioning.

By performing the configuration data management described above, the remote edge device 88 or other suitable component may combine features typically found in stand-alone purpose-built solutions to include custom management of remote, unattended automation devices. As a result, the embodiments described herein offer users the ability to perform secure fleet management of their automation devices, encompassing both firmware and device configuration. Further, the SDM system 50 may coordinate with other devices to securely revert back to safe or approved configuration data in response to tamper detection. As such, tamper detection for both firmware and configuration removes the risk of unauthorized changes, configuration drift, or security compromise. In addition, changes made to the configuration data may be traceable with an auditable history tracked and managed by the SDM system 50. Moreover, the SDM system 50 may provide centralized management of typically remote disparate assets and real-time visibility into the current configuration of any monitored device. Indeed, it should be understood that by employing the embodiments described herein every aspect of communication between the SDM system 50 and the remove edge device 88 is secure by way of signed packages, user authentication and authorization, mutually authenticated communications, edge device authentication, and the like.

Distributing Machine Learning Coefficients Via the SDM System

With the foregoing in mind, it should be noted that the present embodiments described herein may be used to collect data and analytic information directly from the industrial automation devices 20, such that the content is sourced to an applied artificial intelligence (AI) or machine learning (ML) model. Indeed, tools that traditionally communicate with the industrial automation devices 20 do not effectively collect analytics directly (e.g., without intervening, translating, or routing components) from the industrial automation device 20 and source this content to an applied AI/ML model. Furthermore, there is no secure method to enable the update of modeling coefficients within the AI/ML engine to be propagated back to the intelligent automation device within an operational technology (OT) boundary.

That is, the industrial automation device 20 may correspond to an OT device that operates in an OT space or computing environment. As such, the industrial automation device 20 may be involved in adjusting physical processes being implemented via the industrial system 10. As mentioned above, the industrial automation device 20 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the industrial automation device 20 may also be related to various industrial equipment such as mixers, machine conveyors, tanks, skids, specialized original equipment manufacturer machines, and the like. The industrial automation device 20 may also be associated with devices used by the equipment such as scanners, gauges, valves, flow meters, and the like.

OT assets may not be accessible to information technology (IT) systems, which rely on certain operating systems that are distinct from the operating systems that control the OT assets. Instead, OT assets may be individually programmed and managed by a respective design tool operating in the OT space. For many industrial applications, particularly in the process automation space, a distributed industrial control system may provide multiple remote-control nodes that may access or interface with these OT assets via an OT network.

The OT network may thus access a data-rich environment that embodies the industrial automation system 10 including several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 16 may gather OT data indicative of one or more operations of the industrial automation system 10 or the industrial automation devices 20 therein. In this way, the OT data may be analog data or digital data indicative of measurements, statuses, alarms, or the like associated with operation of the industrial automation system 10.

The industrial automation devices 20 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by some control system and a corresponding OT asset. For example, a programmable logic controller (PLC) may operate in the OT network to control operations of an OT asset (e.g., drive, motor). The control systems may be specifically programmed or configured to communicate directly with the respective OT assets.

Figure 13:
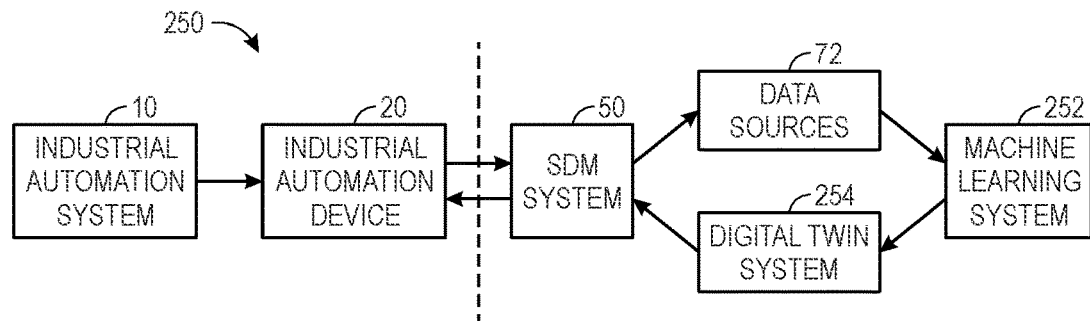
FIG. 13 illustrates a block diagram of a machine learning system that provides control signals to the industrial automation device via the secure deployment management system, in accordance with embodiments described herein.

With the foregoing in mind, the present embodiments described herein may be used to collect data and analytic information directly from the industrial automation devices 20, such that the content is sourced to an applied artificial intelligence (AI) or machine learning (ML) model. FIG. 13, for example, illustrates a block diagram of a machine learning system 250 that provides control signals to the industrial automation device 20 via the SDM system 50, in accordance with embodiments described herein, thereby accessing the OT space.

Referring now to FIG. 13, the SDM system 50 may collect data from the industrial automation devices 20 in any suitable manner as described above. The collected data may be sourced to the data sources 72, which may include a machine learning system 252. The machine learning system 252 may include training models and algorithms that represent the operation of a particular industrial automation device 20, the industrial automation system 10, and the like. In some embodiments, the machine learning system 252 may be implemented by a microprocessor or microcontroller that may be embedded on silicon or a SDM node 52, thereby providing a secure channel to receive the data directly from the industrial automation device 20.

Byway of example, the industrial automation device 20 may send telemetry data to a storage component (e.g., data sources 72). The stored data may be used by the machine learning system 252 to train and produce an analytic model of one or more industrial automation devices 20, the industrial automation system 10, or the like associated with the collected data. The model generated by the machine learning system 252 may include model coefficients that indicates a direction and weight of a relationship(s) between a predictor variable(s) and/or a response variable(s) (e.g., expected output) within the generated model. In some embodiments, the machine learning system 252 may provide the model coefficients to a digital twin system 254 that may update the models used therein with the model coefficients. In addition, the machine learning system 252 may provide the generated model to the industrial automation device 20, such that it may use the model to control and update its operations, configuration data, or the like.

In this way, the machine learning system 252 may tune certain known models for certain devices for different individual devices based on the received data. That is, the telemetry data acquired from a particular industrial automation device 20 may be used to tune an existing model or update model coefficients that are related to the particular industrial automation device 20. The updated or generated model or the resulting model coefficients may be pushed to the industrial automation device or a digital twin system 254 via the SDM system 50, as described above.

In some embodiments, the digital twin system 254 may provide updated predicted or expected output data employing the updated models. The digital twin system 254 may generate updated configuration data to modify the operations of the industrial automation device 20 if the updated model results in expected output data that is outside a threshold of values. In some embodiments, the digital twin system 254 may use the coefficients to produce a score or result of an AI equation or a model function that corresponds to the model prepared by the machine learning system 252. The score may be sent to the industrial automation device 20, which may then update its control model using the score, the model coefficients, or the like.

By Employing the Machine Learning System 252 within the Network Managed by the SDM system 50, the present embodiments described herein securely collects data that may be used to generate a machine learning model using cloud services. Indeed, traditional machine learning systems operating in the OT space include limited computing resources that involves more time and energy for generating useful models. Using the embodiments described herein, the models may be generated using the scale of the cloud services, which may produce more accurate results in a more efficient (e.g., time and energy) manner. It should be understood that the models generated by the machine learning system 252 may include functions, equations, algorithms, and other representations of the devices or systems being modeled.

Hardware-Based Integration of Devices with the SDM System

Figure 15:
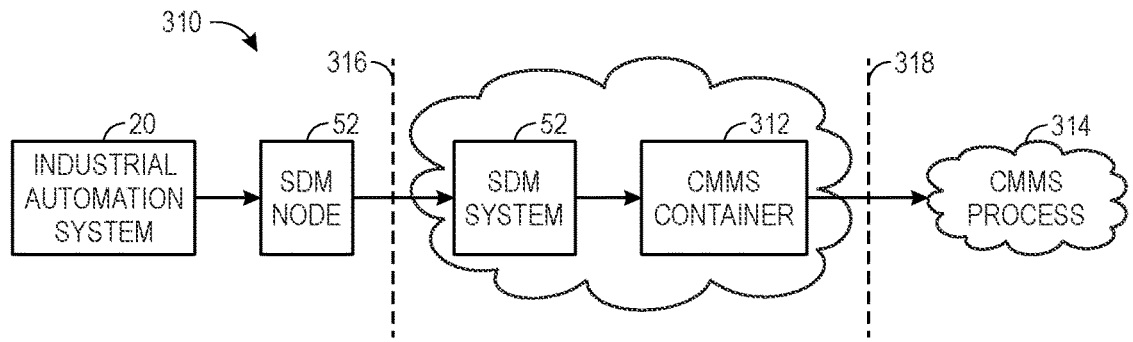
FIG. 15 illustrates a block diagram of a computerized maintenance management system (CMMS) container integrated with a secure deployment management system, in accordance with embodiments described herein.

In addition to directly communicating with the industrial automation devices 20 as described above, a hardware module, such as an option development kit (ODK), may be integrated with the industrial automation device 20 to provide a chainable compute surface to allow the industrial automation device 20 to perform certain additional operations that it previously could not. For example, FIG. 15 illustrates a block diagram 290 of an option development kit (ODK) hardware module 292 integrated within an industrial automation device 20, in accordance with embodiments described herein.

The ODK hardware module 292 may include an option board, a printed circuit board, or other electronic circuit board that performs dedicated operations or tasks. In some embodiments, the ODK hardware module 292 may include prototypes and custom solution circuits that perform a particular function with the data acquired or accessible to the industrial automation device 20. However, since the ODK hardware module 292 may not be authorized to be a tenant with the SDM system 50, the ODK hardware module 292 may be integrated with the SDM node 52, which may then have access to the data collected by the ODK hardware module 292.

In some embodiments, the ODK hardware module 292 may be coupled with the local communication network of industrial automation device 20, thereby enabling it to collect high speed digital bus data. The digital bus may have access to the data accessible to the industrial automation device 20 including external sensors connected to the industrial automation device 20, such as pressure sensors, temperature sensors, and the like. In addition, the digital bus may communicate control model parameters. In any case, the information may be taken from the digital bus applied to local or remote storage via the SDM node 52.

Figure 14:
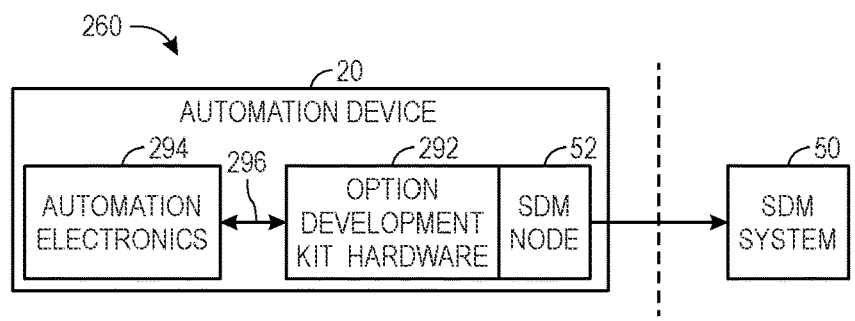
FIG. 14 illustrates a block diagram of option development hardware integrated within an industrial automation device, in accordance with embodiments described herein.

With this in mind, it should be noted that the traditional method of collecting high speed signals is limited to the application of external sensors such as PTs and CTs to collect high fidelity data from a device. The embodiments described herein (e.g., FIG. 14) enables direct connectivity to this high-speed signal source and control models over a high-speed digital device directly via the ODK hardware module 292. The information collected via the ODK hardware module 292 may be egressed to a chained remote edge device, to cloud services, or the like. That is, telemetry data may be provided to the cloud, which may include the machine learning system 252 described above to optimize operations of the tasks performed (e.g., manufacturing processes) by the industrial automation device 20, the industrial system 10, or the like.

In addition, the ODK hardware module 292 may provide localized use of the performed calculations may be used on the industrial automation device 20 to act on the local control. Using local or remote analysis, the present embodiments described herein supports the capability of advanced process control with predictive analysis. The ODK hardware module 292 may allow for improved (e.g., higher frequency) data collection that may be employed by the machine learning system 252 or other suitable component for acute signature analysis in data to predict maintenance issues, such as coupling imbalance.

By integrating the ODK hardware module 292 with the SDM node 52, the industrial automation device 20 may have edge capability for analytics that can participate in a larger applied AI/ML schema. In addition, the opportunity to crowd source values of AI model refinement becomes more likely with the data acquired by the ODK hardware module 292.

Coordinating Maintenance Management Operations Via the SDM System

In the automation and control space today, it is challenging to directly collect CMMS relevant data (e.g., meters and telemetry data) from the industrial automation devices 20 and source this content CMMS data to other assets. That is, compute devices fail to perform this capability due to the lack of available secure channels. Furthermore, it should be noted that the collecting meter readings are traditionally slow due to the lack of an integrated or available CMMS system that has direct access to the relevant data. With this in mind, the present embodiments described herein may employ a chainable compute surface to perform operations of the CMMS system.

Referring now to FIG. 15, FIG. 15 illustrates a block diagram 310 of a computerized maintenance management system (CMMS) container 312 integrated with the SDM system 50, in accordance with embodiments described herein. By way of example, the industrial automation device 20 may send telemetry or other suitable data to the SDM system 50 via the SDM node 52. The SDM system 50 may coordinate (e.g., via data sources 72) with a computerized maintenance management system (CMMS) container 312 to perform certain tasks with a CMMS process 314. The CMMS container 312 may be a software container that provides a standard unit of software package that may perform certain operations in coordination with the CMMS process 314 and may be deployed by a container orchestration system.

The CMMS process 314 may include software being executed via a server device, a cloud-computing system, or any other suitable computing device. The CMMS process 314 may receive data regarding the industrial automation devices 20 on the industrial automation system 10 and facilitate the maintenance operations and tasks associated with maintaining the industrial automation devices 20. The CMMS process 314, in some embodiments, may access a database or include a data model that organizes information related to the industrial automation devices 20, the operational data related to the industrial automation devices 20, the expected maintenance operations of the industrial automation devices 20, the equipment associated with the operation of the industrial automation devices 20, the materials or components that make up the industrial automation devices 20, and the like. As such, the CMMS process 314 may store information related to the model, serial number, location, and other information concerning the industrial automation devices 20 and the components that make up the industrial automation devices 20. In addition, the CMMS process 314 may coordinate resources and labor associated with performing various maintenance tasks for the industrial automation devices 20. In this way, the CMMS process 314 may dynamically schedule preventive maintenance based on the operations of the industrial automation devices 20, the availability of the labor involved in performing the maintenance tasks, and the like.

The CMMS process 314 provide a platform and associated workflows to manage maintenance operations including reactive maintenance, preventative maintenance, and predictive maintenance operations. The CMMS process 314 may centralize maintenance operations for the industrial automation devices 20 of the industrial automation system 10 to consistently monitor and automate scheduling of maintenance operations, adjust operating parameters of the industrial automation devices 20, and the like. By way of operation, the CMMS process 314 may receive operational and maintenance data from various data sources, such as the industrial automation devices 20, to update maintenance models and other predictive algorithms to identify maintenance tasks to be performed for certain industrial automation devices 20.

In some embodiments, the CMMS process 314 may perform the core functions of maintenance operations via a container orchestration system framework. Before continuing, a container orchestration system may be used in the embodiments described herein to manage the operations of the industrial automation devices 20. That is, the container orchestration system may leverage software containers (e.g., operating system) in conjunction with container orchestration systems (e.g., Docker, Kubernetes) to coordinate the construction and deployment of various containers across a number of computing resources, including the industrial automation device 20. In some embodiments, containers may include standard units of software that packages code and its dependencies, such that a container node may execute the application stored in the container regardless of the computing environment or infrastructure. As a result, multiple containers can run on the same machine and share an operating system kernel with other containers, such that each container is running as an isolated process in the respective machine. In this way, container orchestration systems that operate with the SDM system 50 and build application services operate across multiple computing resources, such that certain applications (e.g., packaged as software containers) may be automatically deployed, scaled, and managed in the same machine or across multiple machines in disparate computing environments. In addition, containers may be deployed to available computing surfaces that may be proximate to (e.g., within threshold latency) certain devices in which data is sought. Moreover, containers may be deployed to distribute computing resources in a balanced manner to improve overall network performance and minimize computing costs.

Referring again to FIG. 15, the CMMS process 314 may be implemented via a container orchestration system and may serve as a node within the container orchestration system. As such, containers, such as the CMMS container 312, may be deployed to available computing space to perform certain tasks that may provide information or data that may be useful for the CMMS process 314 to incorporate into its maintenance operations. The CMMS container 312 may be deployed to different areas of the industrial automation system 10 to collect data from data sources located within the respective area or within a threshold latency of communication. The CMMS container 312 may collect data relevant to the operations of the CMMS process 314 performing its operations.

With this in mind, the CMMS container 312 may also be deployed to a computing surface that is capable of communicating with the SDM system 52. That is, the SDM system 52 may coordinate operations with the CMMS container 312 to securely transmit data to the CMMS process 314. For example, after receiving the data from the industrial automation device 20 via the SDM system 50, the CMMS container 312 may send the data stream to the CMMS process 314, which may be part of the data source 72. In this way, the SDM system 50 may route data to a computing surface in which the CMMS container 312 is being executed. In some embodiments, the SDM node 52 may allow the data collected from the industrial automation device 20 to communicate through a first firewall 316 and the CMMS container 312 may communicate the data through a second firewall 318 that may protect the CMMS process 314. Since the CMMS container 312 is part of the container orchestration system employed by the CMMS process 314, the CMMS container 312 is capable of interfacing and communicating directly with the CMMS process 314 via the second firewall 318, whereas the SDM system 50 may be incapable of communicating via the second firewall 318.

When identifying the computing surface to deploy the CMMS container 312, the container orchestration system may identify network locations or positions that are directly (e.g., within the local network, without intervening components) accessible to the SDM system 50, SDM nodes 52, and the like. As such, the SDM system 50 may establish a secure connection with the CMMS container 312, while the CMMS container 312 maintains a separate connection to the CMMS process 314.

It should be noted that the CMMS container 312 may perform other tasks as described in the embodiments above. For instance, the CMMS container 312 may update a machine learning model by updating model coefficients based on received data.

Figure 16:
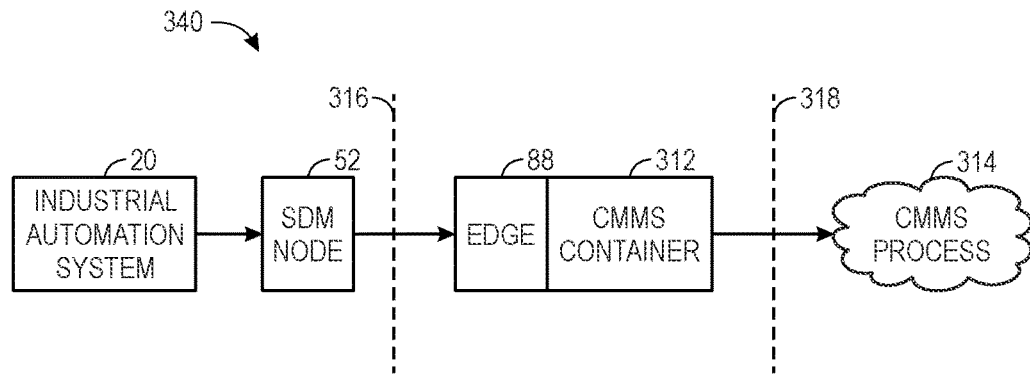
FIG. 16 illustrates a block diagram of a computerized maintenance management system (CMMS) container integrated with a remote edge device, in accordance with embodiments described herein.

In addition to employing the SDM system 50, FIG. 16 illustrates a block diagram 340 of the CMMS) container 312 integrated with the remote edge device 88, in accordance with embodiments described herein. That is, in another variation to provide network security across two firewalls, the chainable compute surface to communicate with the SDM node 52 may be facilitated by the remote edge device 88 described above. By way of example, meter and high-speed data may be sent to the remote edge device 88 via the SDM nodes 52. The data stream may be built with the industrial automation device context, as provided by the remote edge device 88. The CMMS container 312, which may be integrated with the remote edge device 88 may communicate the data to the CMMS process 314.

By performing the embodiments described herein using the CMMS container 312, the data collection process is moved closer to the industrial automation device 20. As a result, meter and high-speed data collection operations are available. Further, data may be wrangled before sending it to the CMMS process 314. In addition, the embodiments presented in FIGS. 14 and 15 allow for segmented networks and isolated configurations, thereby providing secure data infrastructures to provide information, updated configuration data, and other maintenance solutions provided by the CMMS process 314 that can be routed back to the industrial automation device 20 in a secure manner. As a result, minimal control hardware may be used to provide local control based on a control algorithm that may be part of a larger system (e.g., CMMS process 314).

In this way, a compute surface may be implemented with a software container that is executed in coordination with the SDM system 50 and takes direction and executes control based on the inputs and outputs that are provided on the industrial automation device 20. Indeed, inputs and outputs can be directed via communications to industrial automation device 20 directly connected to the SDM system 50. Further, inputs and outputs can be directed via communications over a network to other industrial automation devices 20.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

What is claimed:

1. A method, comprising:
receiving, via a network interface of a secure deployment management (SDM) system comprising at least one processor, a notification indicative of a change in first configuration data stored within an industrial device from a secure deployment management (SDM) node associated with the industrial device, wherein the SDM system and the SDM node are configured to communicate via a secure network of an industrial automation system via a preprogrammed handshake protocol, wherein the change in the first configuration data is received from a user via a computing device configured to locally connect to the industrial device, wherein the SDM node is preregistered with the SDM system and comprises a system-on-chip (SoC) circuit integrated within the industrial device, wherein the SDM node corresponds to one of a plurality of SDM nodes authorized to communicate with the SDM system via the preprogrammed handshake protocol, and wherein the notification is received via a secure communication channel between the SDM system and the SDM node after the secure communication channel is established by the SDM system with the SDM node and one or more security protocols;
retrieving, via the SDM system, second configuration data associated with the industrial device from a data source separate from the SoC circuit in response to receiving the notification, wherein the second configuration data corresponds to the first configuration data excluding the change in the first configuration data, and wherein the data source is configured to communicate with the SDM system via a remote network; and
sending, via the SDM system, the second configuration data to the SDM node via the secure communication channel in response to establishing the secure communication channel between the SDM system and the SDM node and verifying that the second configuration data is associated with the industrial device, wherein the industrial device is configured to:
receive the second configuration data from the SDM node without performing one or more security operations on the second configuration data; and
modify one or more operations performed by the industrial device based on the second configuration data.

2. The method of claim 1, wherein the SDM system comprises a cloud services platform configured to secure one or more communications between the industrial device and one or more other industrial devices.

3. The method of claim 1, wherein the one or more security protocols comprises updating one or more communication filtering operations, one or more communication monitoring operations, or both to secure the secure communication channel from one or more security threats.

4. The method of claim 1, wherein the data source comprises one or more firmware applications, one or more software applications, or both associated with the industrial device, and wherein the data source is associated with a manufacturer of the industrial device and configured to communicate with the SDM system via an additional secure communication channel.

5. The method of claim 1, wherein the change in the first configuration data is associated with one or more changes to one or more operating parameters associated with the industrial device.

6. The method of claim 5, comprising:
retrieving a record of one or more expected operating parameters for the industrial device;
determining that the one or more parameters are different from the one or more expected parameters; and
retrieving the second configuration data from the data source in response to determining that the one or more parameters are different from the one or more expected parameters.

7. The method of claim 5, comprising sending the second configuration data in response to receiving an approval for sending the second configuration data from a user via a computing device.

8. A non-transitory computer-readable medium comprising computer-executable instructions that, when executed, are configured to cause at least one processor to perform one or more operations comprising:
receiving a notification indicative of a change in first configuration data associated with an industrial device from a secure deployment management (SDM) node associated with the industrial device, wherein the notification is received via a network interface of a secure deployment management system comprising the SDM node, and wherein the at least one processor and the SDM node are configured to communicate via a secure network of an industrial automation system via a preprogrammed handshake protocol, wherein the change in the first configuration data is received from a user via a computing device configured to locally connect to the industrial device, wherein the SDM node is preregistered with the at least one processor and comprises a system-on-chip (SoC) circuit integrated within the industrial device, wherein the SDM node corresponds to one of a plurality of SDM nodes authorized to communicate with the at least one processor via the preprogrammed handshake protocol, and wherein the notification is received via a secure communication channel between the at least one processor and the SDM node after the secure communication channel is established by the at least one processor with the SDM node and one or more security protocols;
retrieving second configuration data associated with the industrial device from a data source separate from the SoC circuit in response to receiving the notification, wherein the second configuration data corresponds to the first configuration data excluding the change in the first configuration data, and wherein the data source is configured to communicate with the at least one processor via a remote network; and
sending the second configuration data to the SDM node via the secure communication channel in response to establishing the secure communication channel between the at least one processor and the SDM node and verifying that the second configuration data is associated with the industrial device, wherein the industrial device is configured to:
receive the second configuration data directly from the SDM node without performing one or more security operations on the second configuration data; and
modify one or more operations performed by the industrial device based on the second configuration data.

9. The non-transitory computer-readable medium of claim 8, wherein the one or more security protocols comprises using one or more security certificates issued to the SDM node prior to communicating with the SDM node.

10. The non-transitory computer-readable medium of claim 8, wherein the second configuration data is received from the data source comprising one or more firmware updates, one or more software applications, or both associated with the industrial device.

11. The non-transitory computer-readable medium of claim 8, wherein the one or more security protocols comprise using encryption algorithm, a firewall, or both.

* * * * *